United States Patent
Karam et al.

(10) Patent No.: US 11,030,485 B2
(45) Date of Patent: Jun. 8, 2021

(54) SYSTEMS AND METHODS FOR FEATURE TRANSFORMATION, CORRECTION AND REGENERATION FOR ROBUST SENSING, TRANSMISSION, COMPUTER VISION, RECOGNITION AND CLASSIFICATION

(71) Applicants: Lina Karam, Tempe, AZ (US); Tejas Borkar, Tempe, AZ (US)

(72) Inventors: Lina Karam, Tempe, AZ (US); Tejas Borkar, Tempe, AZ (US)

(73) Assignee: Arizona Board of Regents on Behalf of Arizona State University, Tempe, AZ (US)

(*) Notice: Subject to any disclaimer, the term of this patent is extended or adjusted under 35 U.S.C. 154(b) by 167 days.

(21) Appl. No.: 16/370,261

(22) Filed: Mar. 29, 2019

(65) Prior Publication Data
US 2019/0303720 A1    Oct. 3, 2019

Related U.S. Application Data

(60) Provisional application No. 62/650,905, filed on Mar. 30, 2018.

(51) Int. Cl.
*G06K 9/62* (2006.01)
*G06N 3/08* (2006.01)
*G06T 5/00* (2006.01)

(52) U.S. Cl.
CPC ........... *G06K 9/6257* (2013.01); *G06K 9/628* (2013.01); *G06K 9/6215* (2013.01); *G06K 9/6234* (2013.01); *G06K 9/6262* (2013.01); *G06N 3/08* (2013.01); *G06T 5/002* (2013.01)

(58) Field of Classification Search
CPC .. G06K 9/00624; G06K 9/036; G06K 9/2018; G06K 9/4628; G06K 9/6215; G06K 9/6228; G06K 9/6234; G06K 9/624; G06K 9/6256; G06K 9/6257; G06K 9/6262; G06K 9/627; G06K 9/628; G06K 9/6289; G06N 20/10; G06N 3/0454; G06N 3/08; G06N 3/084; G06T 5/002
See application file for complete search history.

(56) References Cited

U.S. PATENT DOCUMENTS

| | | | |
|---|---|---|---|
| 7,551,671 B2 | 6/2009 | Tyldesley et al. |
| 9,501,710 B2 | 11/2016 | Karam et al. |
| 9,704,232 B2 | 7/2017 | Karam et al. |
| 2008/0259796 A1 | 10/2008 | Abousleman et al. |

(Continued)

OTHER PUBLICATIONS

Haris, Muhammad, Gregory Shakhnarovich, and Norimichi Ukita. "Deep back-projection networks for super-resolution." Proceedings of the IEEE conference on computer vision and pattern recognition. 2018. (Year: 2018).*

(Continued)

*Primary Examiner* — Nirav G Patel
(74) *Attorney, Agent, or Firm* — Polsinelli PC

(57) ABSTRACT

Embodiments of a deep learning enabled generative sensing and feature regeneration framework which integrates low-end sensors/low quality data with computational intelligence to attain a high recognition accuracy on par with that attained with high-end sensors/high quality data or to optimize a performance measure for a desired task are disclosed.

14 Claims, 18 Drawing Sheets
(16 of 18 Drawing Sheet(s) Filed in Color)

(56) References Cited

U.S. PATENT DOCUMENTS

2017/0330053 A1* 11/2017 Park .................. G06K 9/4661
2018/0364033 A1* 12/2018 Doring ................ H04N 5/232

OTHER PUBLICATIONS

A. Deshpande, J. Rock, and D. Forsyth, "Learning Large-Scale Automatic Image Colorization," IEEE International Conference on Computer Vision (ICCV), pp. 567-575, 2015.
A. Krizhevsky, I. Sutskever, and G. E. Hinton, "ImageNet classification with deep convolutional neural networks," Advances in Neural Information Processing Systems, pp. 1097-1105, 2012.
A. Rogalski, P. Martyniuk, and M. Kopytko, "Challenges of small-pixel infrared detectors: a review," Reports on Progress in Physics, vol. 79, No. 4, pp. 046501, 2016.
Basu S, Karki M, Ganguly S, DiBiano R, Mukhopadhyay S, Gayaka S, Kannan R, Nemani R (2015) Learning sparse feature representations using probabilistic quadtrees and deep belief nets. In: Neural Processing Letters, Springer, pp. 1-13 3.
Chollet F (2015) Keras. https : //github. com/fchollet/ keras 1, 10.
Dabov K, Foi A, Katkovnik V, Egiazarian K (2009) BM3D image denoising with shape-adaptive principal component analysis. In: Proc. Workshop on Signal Processing with Adaptive Sparse Structured Representations (SPARS09) 10, 15.
Deng J, Dong W, Socher R, Li LT, Li K, Fei-Fei L (2009) ImageNet: A large-scale hierarchical image database. In: Proceedings of the IEEE Conference on Computer Vision and Pattern Recognition, IEEE, pp. 248-255 1, 2, 3, 4, 14.
Diamond S, Sitzmann V, Boyd SP, Wetzstein G, Heide F (2017) Dirty pixels: Optimizing image classification architectures for raw sensor data. CoRR abs/1701.06487, URL ht tp : // arxiv. org/abs/1701 .06487 4.
Dodge S, Karam L (2016) Understanding how image quality affects deep neural networks. hi: Eighth International Conference on Quality of Multimedia Experience (QoMEX), pp. 1-6 1, 3.
Donahue J, Jia Y, Vinyals 0, Hoffman J, Zhang N, Tzeng E, Darrell T (2014) DeCAF: A deep convolutional activation feature for generic visual recognition. In: International Conference on Machine Learning, pp. 647-655 17.
Dong W, Zhang L, Shi G, Li X (2013) Nonlocally centralized sparse representation for image restoration. In: IEEE Trans. on Image Processing, vol. 22, pp. 1620-1630 10, 15.
E. Fossum, "CMOS image sensors: Electronic camera-on-a-chip," IEEE Transactions on Electron Devices, vol. 44, No. 10, pp. 1689-1698, 1997.
Everingham M, Van Gool L, Williams CM, Winn J, Zisserman A (2010) The Pascal visual object classes (VOC) challenge. hi: International Journal of Computer Vision, vol. 88, pp. 303-338 18.
Fei-Fei L, Fergus R, Perona P (2007) Learning generative visual models from few training examples: An incremental bayesian approach tested on 101 object categories. In: Computer Vision and Image Understanding, Elsevier, vol. 106, pp. 59-70, URL http://www.vision.caltech.edu/ Image_Datasets/Caltech101/ 2.
Girshick R, Donahue J, Darrell T, Malik J (2014) Rich feature hierarchies for accurate object detection and semantic segmentation. In: Proceedings of the IEEE Conference on Computer Vision and Pattern Recognition, pp. 580-587 1, 18.
Goodfellow IJ, Shlens J, Szegedy C (2014) Explaining and harnessing adversarial examples. arXiv preprint arXiv:14126572 3.
Griffin G, Holub A, Perona P (2007) Caltech-256 object category dataset URL http: //www. vision. caltech. edu/Image_Datasets/Caltech256/ 2.
He K, Zhang X, Ren S, Sun J (2016) Deep residual learning for image recognition. In: Proceedings of the IEEE Conference on Computer Vision and Pattern Recognition, pp. 770-778 1, 4, 8, 9, 10, 13, 15.
J. Sobrino, F. Del Frate, and M. Drusch, "Review of thermal infrared applications and requirements for future high-resolution sensors," IEEE Transactions on Geoscience and Remote Sensing, vol. 54, No. 5, pp. 2963-2972, 2016.
Jia Y, Shelhamer E, Donahue J, Karayev S, Long J, Girshick R, Guadarrama S, Darrell T (2014) Caffe: Convolutional architecture for fast feature embedding. arXiv preprint arXiv:14085093 1.
Karahan S, Yildirum MK, Kirtac K, Rende FS, Butun G, Ekenel HK (2016) How image degradations affect deep CNN-based face recognition? In: International Conference of the Biometrics Special Interest Group (BIOSIG), IEEE, pp. 1-5 4.
Karam Lj, Zhu T (2015) Quality labeled faces in the wild (QLFW): a database for studying face recognition in real-world environments. In: Proc. SPIE 9394, Human Vision and Electronic Imaging, vol. XX 3.
Krizhevsky A, Hinton G (2009) Learning multiple layers of features from tiny images. Tech. rep., URL https : //www. cs . toronto edu/ -kriz/cifar html 2,4.
L. A. Gatys, A.S. Ecker, and M. Bethge, "A Neural Algorithm of Artistic Style," arXiv:1508.06576 [cs.CV], 2015.
L. A. Gatys, A.S. Ecker, and M. Bethge, "Image Style Transfer Using Convolutional Neural Networks," IEEE CVPR, pp. 2414-2423, 2016.
Lenc K, Vedaldi A (2015) Understanding image representations by measuring their equivariance and equivalence. In: Proceedings of the IEEE Conference on Computer Vision and Pattern Recognition, pp. 991-999 3.
Lin TY, Maire M, Belongie S, Hays J, Perona P, Ramanan D, Dollar P, Zitnick CL (2014) Microsoft COCO: Common objects in context. In: European Conference on Computer Vision, Springer, pp. 740-755 1, 18.
M. Bigas, E. Cabruja, J. Forest, and J. Salvi., "Review of CMOS image sensors," Microelectronics Journal, vol. 37, No. 5, pp. 433-451, 2006.
M. Brown and S. Siisstrunk, Multispectral SIFT for Scene Category Recognition, IEEE International Conference on Computer Vision and Pattern Recognition (CVPR), pp. 177-184, 2011.
M. Grgic, K. Delac, S. Grgic, SCface—surveillance cameras face database, Multimedia Tools and Applications Journal, vol. 51, No. 3, pp. 863-879, Feb. 2011.
M. Limmer and H.P.A. Lensch, "Infrared Colorization Using Deep Convolutional Neural Networks," IEEE International Concerence on Machine Learning and Applications (ICMLA), pp. 61-68, 2016.
Maaten L, Hinton G (2008) Visualizing data using t-SNE. Journal of Machine Learning Research 9(Nov):2579-2605 1, 3, 2, 14.
Nguyen A, Yosinski J, Clune J (2015) Deep neural networks are easily fooled: High confidence predictions for unrecognizable images. In: Proceedings of the IEEE Conference on Computer Vision and Pattern Recognition (CVPR), pp. 427-436 3.
Nilsback ME, Zisserman A (2008) Automated flower classification over a large number of classes. In: Proceedings of the Indian Conference on Computer Vision, Graphics and Image Processing, pp. 722-729 4.
O. Russakovsky, J. Deng, H. Su, J. Krause, S. Satheesh, S. Ma, Z. Huang, A. Karpathy, A. Khosla, M. Bernstein, A. C. Berg, and L. Fei-Fei, "ImageNet Large Scale Visual Recognition Challenge," International Journal of Computer Vision (IJCV), vol. 115, No. 3, pp. 211-252, 2015.
Ponomarenko N, Lukin V, Zelensky A, Egiazarian K, Carli M, Battisti F (2009) TID2008-A database for evaluation of full-reference visual quality assessment metrics. In: Advances of Modern Radioelectronics, vol. 10, pp. 30-45 4.
R. Zhang, P. Isola, and A.A. Efros, "Colorful Image Colorization," European Conference on Computer Vision (ECCV), In: Leibe B., Matas J., Sebe N., Welling M.(eds) Computer Vision—ECCV 2016. Lecture Notes in Computer Science, vol. 9907, pp. 649-666, Springer, Cham.
Redmon J, Divvala S, Girshick R, Farhadi A (2016) You only look once: Unified, real-time object detection. In: Proceedings of the IEEE Conference on Computer Vision and Pattern Recognition, pp. 779-788 1.
Ren S, He K, Girshick R, Sun J (2015) Faster R-CNN: Towards real-time object detection with region proposal networks. In: Advances in Neural Information Processing Systems, pp. 91-99 1.
Rodner E, Simon M, Fisher RB, Denzler J (2016) Fine-grained recognition in the noisy wild: Sensitivity analysis of convolutional neural networks approaches. arXiv preprint arXiv:161006756 4.

(56) References Cited

OTHER PUBLICATIONS

Rumelhart DE, Durbin R, Golden R, Chauvin Y (1995) Backpropagation. L. Erlbaum Associates Inc., Hillsdale, NJ, USA, chap Backpropagation: The Basic Theory, pp. 1-34 8.

S. Dodge and L. Karam, "A study and comparison of human and deep learning recognition performance under visual distortions," International Conference on Computer Communications and Networks, 7 pages, Jul.-Aug. 2017.

S. Dodge and L. Karam, "Can the early human visual system compete with deep neural networks?" ICCV Workshop on Mutual Benefits of Cognitive and Computer Vision, 7 pages, Oct. 2017.

Simonyan K, Zisserman A (2014) Very deep convolutional networks for large-scale image recognition. CoRR abs/1409.1556, URL http: //arxiv. org/abs/1409.1556 1, 4, 15.

Springenberg JT, Dosovitskiy A, Brox T, Riedmiller M (2014) Striving for simplicity: The all convolutional net. arXiv preprint arXiv:14126806 4, 5.

Szegedy C, Liu W, Jia Y, Sermanet P, Reed S, Anguelov D, Erhan D, Vanhoucke V, Rabinovich A (2015) Going deeper with convolutions. In: Proceedings of the IEEE Conference on Computer Vision and Pattern Recognition, pp. 1-9 1, 15.

Szegedy C, Zaremba W, Sutskever I, Bruna J, Erhan D, Goodfellow I, Fergus R (2013) Intriguing properties of neural networks. arXiv preprint arXiv:13126199 3.

T. Borkar and L. Karam, "DeepCorrect: Correcting DNN models against Image Distortions," arXiv:1705.02406 [cs.CV], 2017.

V. V. Kniaza, V. S. Gorbatsevicha, and V. A. Mizginova, "Thermalnet: A Deep Convolutional Network for Synthetic Thermal Image Generation," 2nd International ISPRS Workshop on PSBB, pp. 41-45, May 2017.

Vasiljevic I, Chakrabarti A, Shakhnarovich G (2016) Examining the impact of blur on recognition by convolutional networks. CoRR abs/1611.05760, URL http: / /arxiv. org/abs/ 1611.05760 4, 10.

Wah C, Branson S, Welinder P, Perona P, Belongie S (2011) The caltech-ucsd birds-200-2011 dataset. Tech Rep URL http: / /www . vision.caltech.edu/visipedia/ CUB-200 . html 4.

Xiao J, Hays J, Ehinger KA, Oliva A, Torralba A (2010) Sun database: Large-scale scene recognition from abbey to zoo. In: Proceedings of the IEEE Conference on Computer Vision and Pattern Recognition (CVPR), IEEE, pp. 3485-3492 2.

Yu F, Koltun V (2015) Multi-scale context aggregation by dilated convolutions. CoRR abs/1511.07122, URL http: / /arxiv. org/ abs /1511 . 07122, 1511.07122 16.

Zhou Y, Song S, Cheung NM (2017) on classification of distorted images with deep convolutional neural networks. arXiv preprint arXiv:170101924 4.

* cited by examiner

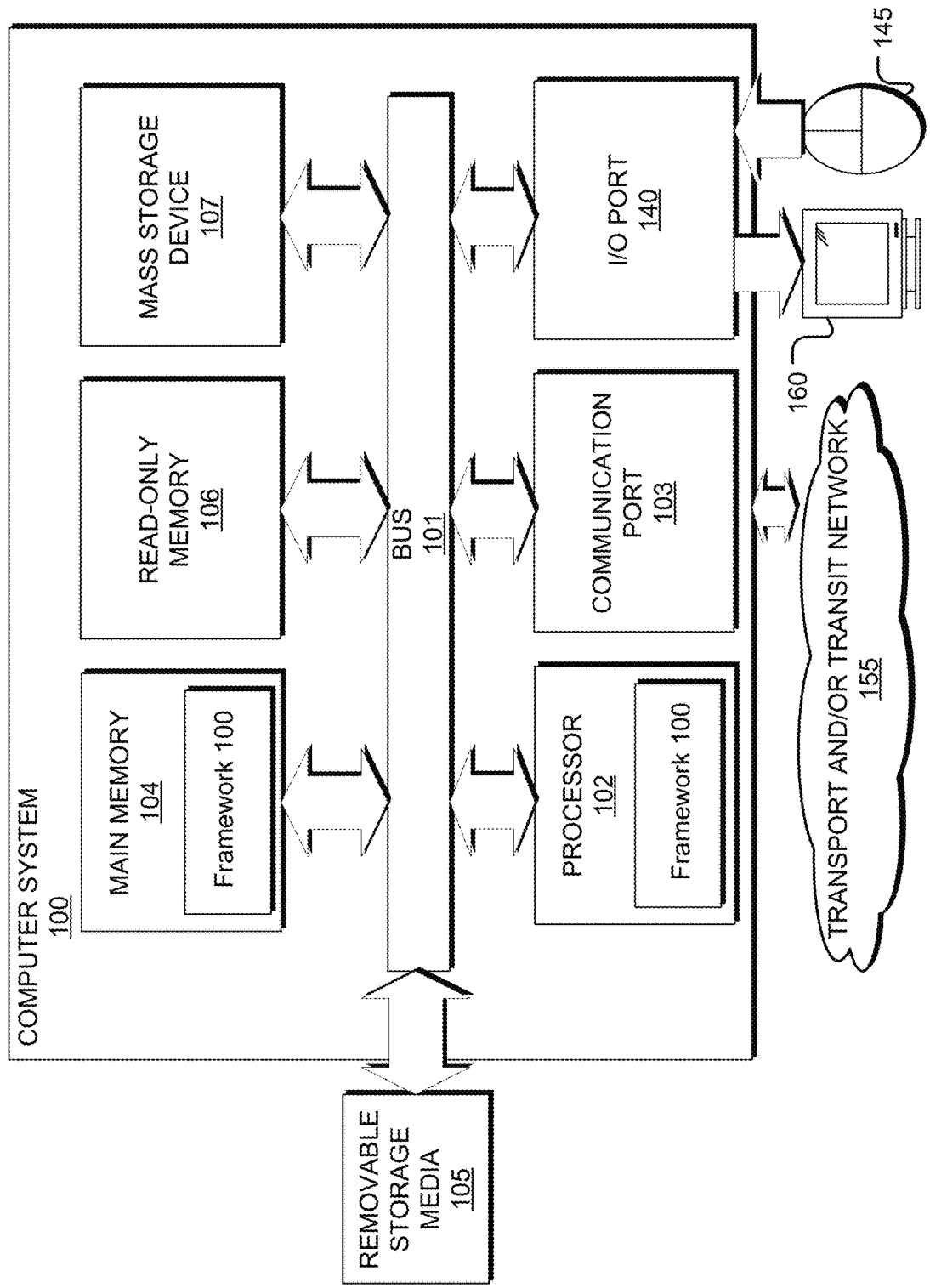

SYSTEMS AND METHODS FOR FEATURE TRANSFORMATION, CORRECTION AND REGENERATION FOR ROBUST SENSING, TRANSMISSION, COMPUTER VISION, RECOGNITION AND CLASSIFICATION

CROSS REFERENCE TO RELATED APPLICATIONS

This is a U.S. non-provisional patent application that claims benefit to U.S. provisional patent application Ser. No. 62/650,905 filed on Mar. 30, 2018 which is incorporated by reference in its entirety.

FIELD

The present disclosure generally relates to systems and methods for feature corrections and regeneration for robust sensing, transmission, computer vision, recognition, and classification.

BACKGROUND

Today, state-of-the-art algorithms for processing, generating, recognizing, and classifying media (e.g., speech, audio, image, video, text), sensor data (e.g., camera, RADAR, LIDAR, IR, Ultrasound, MRI, X-RAY and other modalities), and other forms of numerical data, employ some form of deep neural networks (DNNs). In particular, DNNs have been popularly used in computer vision tasks like image classification, object recognition, and semantic segmentation. The ease of design for such networks, afforded by numerous open source deep learning libraries has established DNNs as the go-to solution for many classification and recognition applications. Even challenging computer vision tasks like image classification and object recognition, which were previously considered to be extremely difficult, have seen great improvements in their state-of-the-art results due to the use of DNNs. An important factor contributing to the success of such deep architectures in computer vision tasks is the availability of large scale annotated datasets.

The quality of data (e.g., quality of audio data, visual quality of input images, level of noise/distortion in acquired or transmitted data) is an aspect very often overlooked while designing DNN based systems. For example, in most realistic computer vision applications, an input image undergoes some form of image distortion including blur and additive noise during image acquisition, transmission or storage. However, most popular large scale datasets do not have images with such artifacts. Dodge and Karam (2016) showed that even though such image distortions do not represent adversarial samples for a DNN, they do cause a considerable degradation in classification performance. FIGS. 1A and 1B show the effect of image quality on the prediction performance of a DNN trained on high quality images devoid of distortions.

Testing distorted images with a pre-trained DNN model for AlexNet, it has been observed that adding even a small amount of distortion to the original image results in a misclassification, even though the added distortion does not hinder the human ability to classify the same images (FIGS. 1A and 1B). In the cases where the predicted label for a distorted image is correct, the prediction confidence drops significantly as the distortion severity increases. Such results were also observed with other state-of-the-art DNNS including but not limited to GoogleNet, VGG, and ResNET based DNN architectures.

A concise way to observe the impact of image quality on DNN classification performance is to visualize the distribution of classes in the feature space learnt by a DNN. Since DNNs learn high dimensional feature spaces that are difficult to visualize, a visualization method proposed by Maaten and Hinton (2008) has been used to embed the high dimensional features from the 4096-dimensional penultimate layer of AlexNet, to a 2-dimensional feature space for 11 image classes in the ImageNet dataset. The 11 classes are chosen from the higher levels of the ImageNet WordNet hierarchy, such that no two classes belong to the same node, thus ensuring reasonable separability of undistorted images of these classes.

FIG. 2 shows the effect of image quality on the discriminative power of the features learnt by a DNN from high quality images, through t-SNE embeddings (Maaten and Hinton, 2008) of object classes affected by different types and levels of distortion. One can see that the features of a pre-trained model are discriminative enough to generate a concise clustering of high-quality images from the same class and also provide a good separation between clusters of other classes (FIG. 2, column 1). However, the addition of distortion not only reduces the separation between clusters but also causes the clusters to become wider, eventually resulting in most clusters mapping into each other and thus becoming inseparable as the distortion severity increases. This indicates that features learnt from a dataset of high quality data are not invariant to data distortion or noise and cannot be directly used for applications where the quality of data is different than that of the data used for training. Furthermore, in addition to distortions and/or noise introduced in the data due to data acquisition, sensor limitations, data processing and/or compression, channel noise and/or packet loss during transmission, deep neural network (DNN) predictions have been shown to be vulnerable to carefully crafted adversarial perturbations. An adversarial perturbation is a small magnitude, carefully crafted image perturbation almost visually imperceptible to humans, which when added to an image causes DNNs to misclassify the image even when the original perturbation-free version of such an image is correctly classified with high confidence (Goodfellow et al., 2014; Moosavi-Dezfooli et al., 2017; Papernot et al., 2017; Carlini et al., 2019). Some issues to consider include the following: For a network trained on undistorted data, are all convolutional filters in the network equally susceptible to distortions (e.g., noise, blur, adversarial perturbation) in the input data? Are networks able to learn some filters that are invariant to input distortions, even when such distortions are absent from the training set? Is it possible to identify and rank the convolutional filters that are most susceptible to image distortions and recover the lost performance, by only correcting the outputs of such ranked filters.

It is with these observations in mind, among others, that various aspects of the present disclosure were conceived and developed.

BRIEF DESCRIPTION OF THE DRAWINGS

The present patent or application file contains at least one drawing executed in color. Copies of this patent or patent application publication with color drawing(s) will be provided by the Office upon request and payment of the necessary fee.

FIG. 19 is a simplified illustration showing a computing system for implementing the generative sensing framework and DeepCorrect framework, according to aspects of the present disclosure.

Corresponding reference characters indicate corresponding elements among the view of the drawings. The headings used in the figures do not limit the scope of the claims.

DETAILED DESCRIPTION

Figures 1A, 1B:
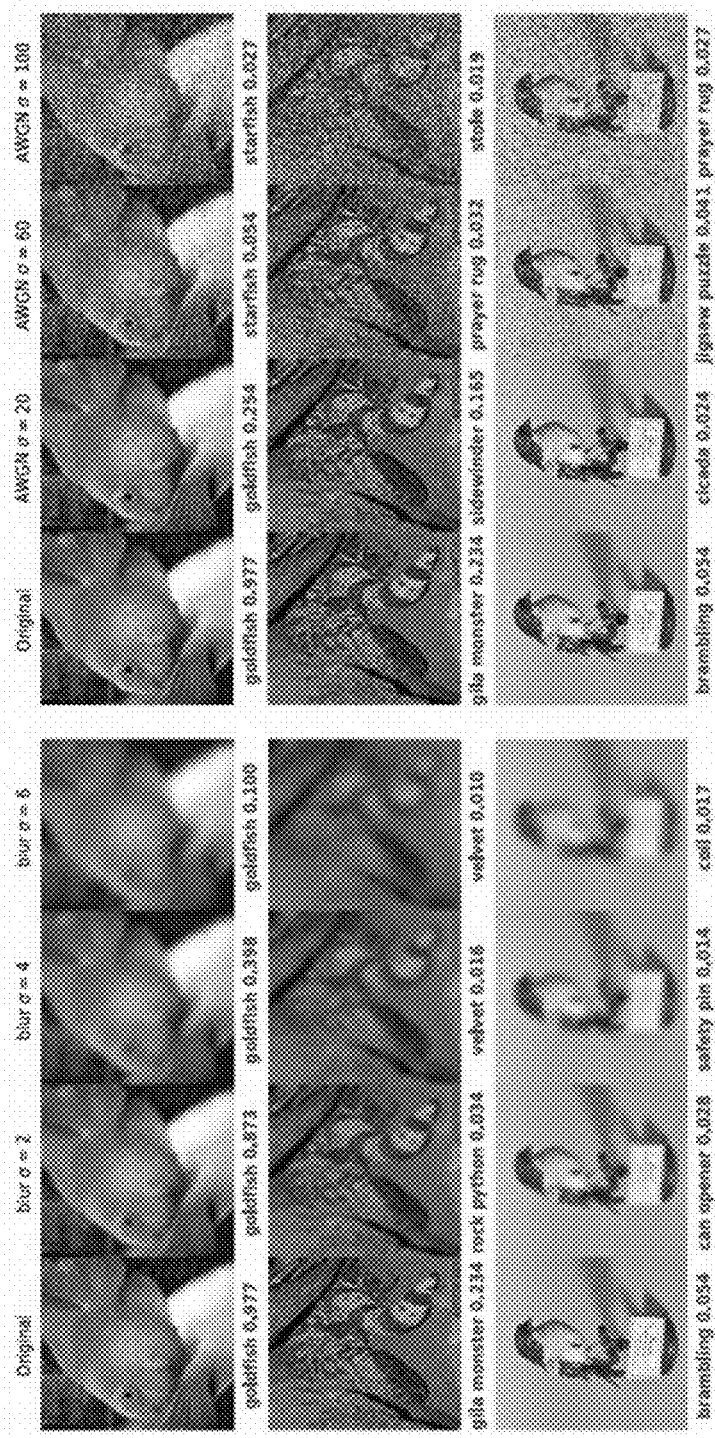
FIGS. 1A and 1B are images showing the effect of image quality on deep neural network (DNN) predictions.

Each of the figures and exemplary embodiments described below shows a specific example of the present disclosure. The specific data type (e.g., image data), numerical values, shapes, materials, constituent elements, the arrangement and connection of the constituent elements, steps, the processing order of the steps etc. shown in the following figures and exemplary embodiments are mere examples, and therefore do not limit the inventive concept in the present disclosure. Therefore, among the constituent elements in the following exemplary embodiments, the constituent elements not recited in any one of the independent claims defining the most generic part of the inventive concept are not necessarily required in order to overcome the disadvantages. Furthermore, although the descriptions make use of images (visual data) for describing and illustrating aspects of this disclosure, visual data and images are mere examples and therefore do not limit the inventive concept in the present disclosure to such data type.

In one embodiment, referred to herein as the DeepCorrect framework, the aforementioned questions are addressed by first evaluating the effect of image distortions like blur, noise, and adversarial perturbations on the outputs of pre-trained convolutional filters. The present disclosure observes that for every layer of convolutional filters in the DNN, certain filters are far more susceptible to input distortions than others and that correcting the activations of these filters can help recover lost performance. Metrics are disclosed herein to rank the convolutional filters in order of the highest gain in classification accuracy upon correction. In one embodiment, the features can be corrected by appending correction units taking the form of small blocks of stacked convolutional layers such as a residual block with a single skip connection or other CNN-based block or other blocks implementing a transformation, at the output of select filters and train them to correct the worst distortion-affected filter activations using a target-oriented loss or other desired loss function, whilst leaving the rest of the pre-trained filter outputs in the network unchanged.

Applying the DeepCorrect framework for common vision tasks like image classification, object recognition, and scene classification significantly improves the robustness of DNNs against distorted images and also outperforms the alternative approach of network fine-tuning, while training significantly lesser parameters than the fine-tuned or retrained network.

In another embodiment, a deep learning enabled generative sensing framework is described which integrates low-end sensors or low-quality data with computational intelligence to attain a high recognition accuracy on par with that attained with high-end sensors or high quality data. The proposed generative sensing framework aims at transforming low-end, low-quality sensor data into higher quality sensor data in terms of achieved classification accuracy. The low-end data can be transformed into higher quality data of the same modality or into data of another modality. Different from existing methods for image generation, the proposed framework is based on discriminative models and targets to maximize the recognition accuracy rather than a similarity measure. This is achieved through the introduction of selective feature regeneration in a deep neural network (DNN). The proposed generative sensing may essentially transform low-quality sensor data into high-quality information for robust perception. In addition to the aforementioned distortions due to sensing and data acquisition, the generative sensing framework can also be applied to low quality data corrupted due to transmission (e.g., transmission over noisy channels or error-prone transmitted link) to achieve a classification accuracy on par with that obtained with high-quality data.

In the generative sensing framework, the sensor can be replaced with a communication channel or transmission link, wherein distortions are induced due to compression, channel noise, or packet loss, for example.

DeepCorrect Framework—Experimental Setup

The various image distortions, datasets and network architectures used to evaluate the susceptibility of individual convolutional filters to input distortions are described below. These are provided for illustrating some aspects of this invention and do not limit the scope of the claims.

Datasets

Two popular image classification datasets were used: 1) CIFAR-100 (Krizhevsky and Hinton, 2009) which has fixed size images of 32×32 pixels and 2) ImageNet (Deng et al, 2009) (ILSVRC2012) which has images of varying resolution, usually greater than 128×128 pixels. CIFAR-100 consists of 50,000 training images and 10,000 testing images covering 100 different object categories. The CIFAR-100 training set was split into two sets: 45,000 images for training and 5,000 for validation. The ImageNet dataset consists of around 1.3 million training images covering 1,000 object classes and 50,000 validation images, with 50 validation images per class. The validation set of ImageNet was used for evaluating performance.

Distortions

Four important and conflicting types of image distortions were evaluated: Gaussian blur and Additive White Gaussian Noise (AWGN) over 6 levels of distortion severity, sensor noise from (Diamond et al. 2017), and adversarial perturbations (also known as adversarial attacks). Gaussian blur, often encountered during image acquisition and compression (Pono-marenko et al, 2009), represents a distortion that eliminates high frequency discriminative object features like edges and contours. AWGN is commonly used to model additive noise encountered during image acquisition and transmission. Sensor noise is encountered during image acquisition. Adversarial perturbation is a small magnitude, carefully crafted image perturbation almost visually imperceptible to humans, which when added to an image causes DNNs to misclassify the image even when the original perturbation-free version of such an image is correctly classified by the DNNs with high confidence.

Since datasets with different input resolutions were used, a different set of distortion parameters were used for each dataset for the Gaussain blur and AWGN. For CIFAR-100, a noise standard deviation $\sigma_n \in \{5, 10, 15, 20, 25, 30\}$ for AWGN and blur standard deviation $\sigma_b \in \{0.5, 1, 1.5, 2.0, 2.5, 3.0\}$ for Gaussian blur were used. For ImageNet, a noise standard deviation $\sigma_n \in \{10, 20, 40, 60, 80, 100\}$ for AWGN and blur standard deviation $\sigma_b \in \{1, 2, 3, 4, 5, 6\}$ for Gaussian blur, are used. For both datasets, the size of the blur kernel is set to four times the blur standard deviation $\sigma_b$.

Adversarial perturbations were generated for various DNNs using existing adversarial attacks methods (Moosavi-Dezfooli et al., 2017; Su et al., 2017; Goodfellow et al., 2014; Moosavi-Dezfooli et al., 2016; Kurakin et al., 2016; Khrulkov et al., 2018). Generated adversarial perturbations were added to images from the ImageNet dataset.

Network Architectures

Figures 3A, 3B:
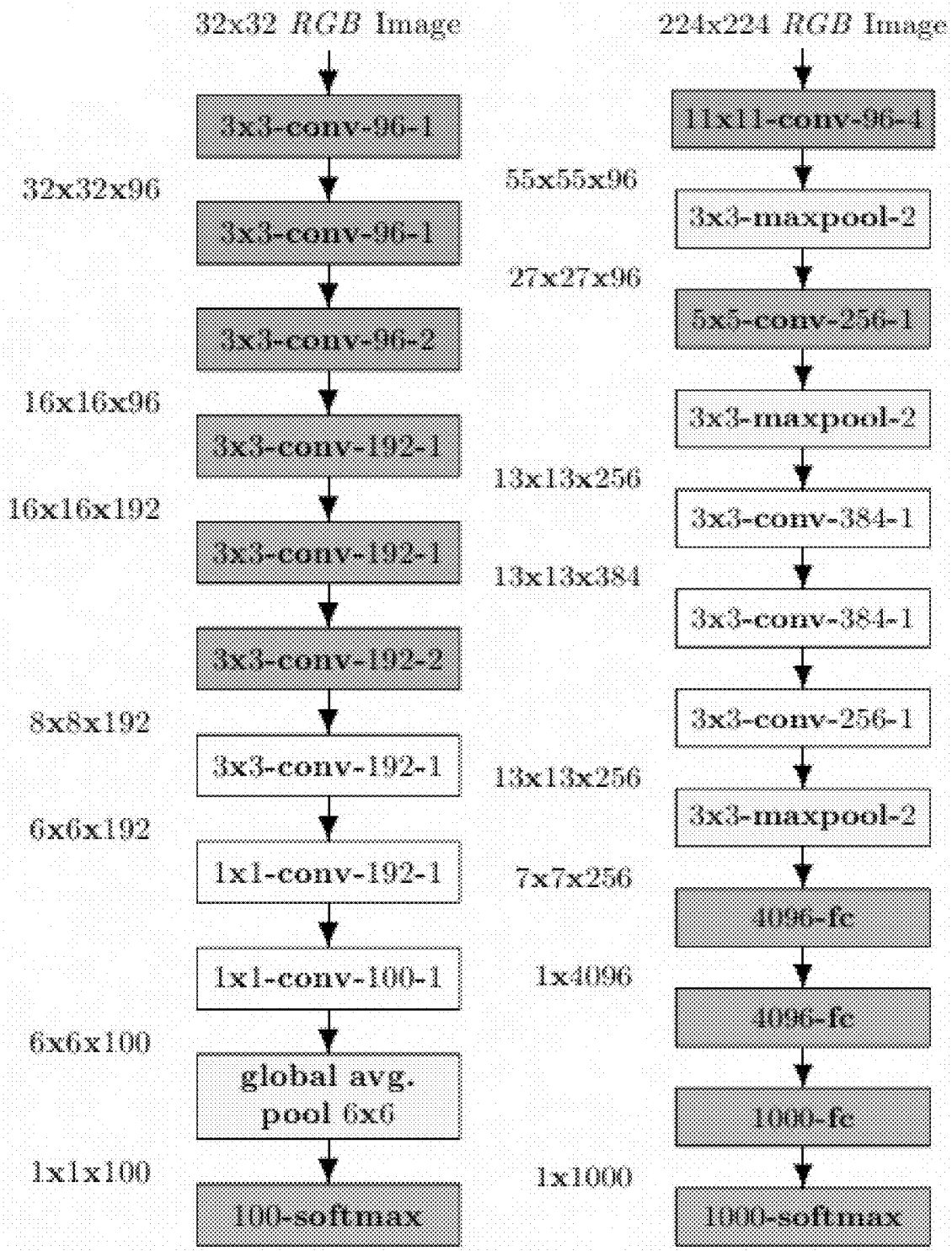
FIGS. 3A, 3B, and 3C are network architectures for baseline models.
Figure 3C:
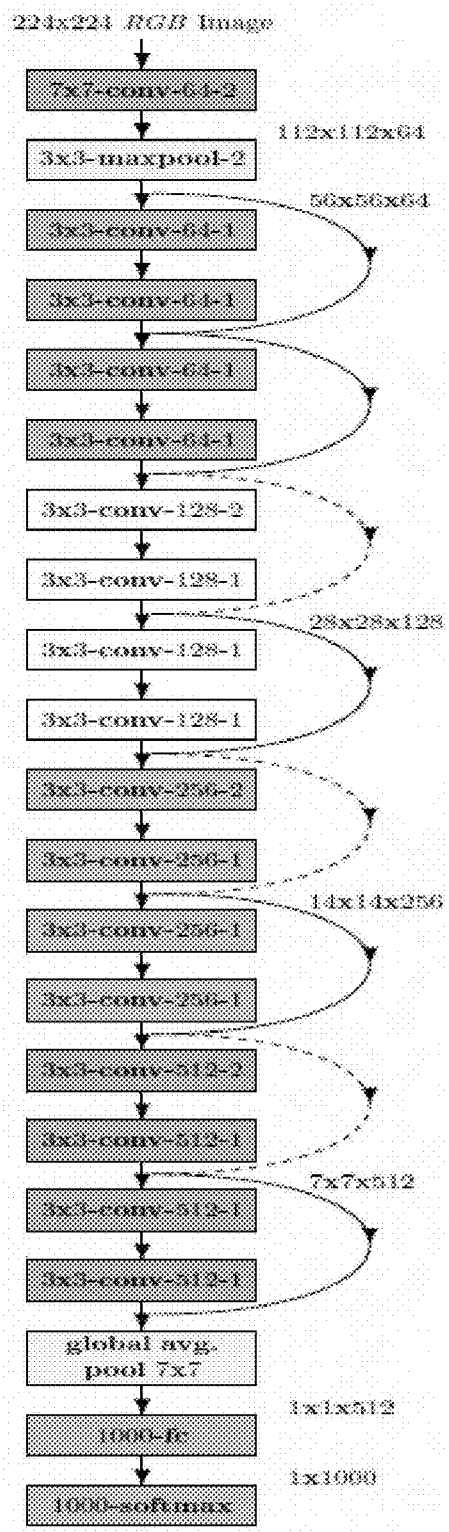

Due to the different input resolutions for ImageNet and CIFAR-100 images and also to illustrate the robustness of our method to various DNN architectures, two different network architectures are used herein for illustration and for reporting performance results, specifically: a fully-convolutional network (Springenberg et al., 2014) that consists of 9 convolutional layers with a final 100-way softmax layer for CIFAR-100 (FIG. 3A) and an 8-layered convolutional DNN also known as AlexNet (Krizhevsky et al., 2012) comprised of both convolutional and fully connected dense layers with a final 1000-way softmax layer for ImageNet (FIG. 3B). We also tested our framework on other networks such as the deeper 18-layered network with residual connections known as ResNet18 (He et al., 2016) comprised of convolutional layers, skip connections, fully-connected dense layer with a final 1000-way softmax layer for ImageNet (FIG. 3C) and observed similar gains and advantages when using our disclosed DeepCorrect framework. The terms "pre-trained" or "baseline" network are used herein to refer to any network that is trained on undistorted images.

The version of a fully-convolutional network shown in FIG. 3A is based on the All-Convolutional Net proposed by Springenberg et al (2014), with the addition of batch normalization units after each convolutional layer. This network, which serves as the baseline model for CIFAR-100, was trained using stochastic gradient descent. The AlexNet DNN proposed by Krizhevsky et al (2012), shown in FIG. 3B, was used as a baseline model for the ImageNet dataset.

For adversarial perturbations, various network architectures were used including CaffeNet, which is a single-GPU version of AlexNet (Krizhevsky et al., 2012), VGG-16 (Simonyan and Zisserman, 2014), VGG-F (Chatfield et al., 2014), GoogLeNet (Szegedy et al., 2015), and ResNet50 (He et al., 2016).

DeepCorrect Framework

It is important for a DNN to perform well on both clean and distortion-affected images and an ideal performance curve should have the same accuracy for all levels of distortion severity. Top-1 accuracy for both ImageNet and CIFAR-100 baseline models is tabulated for Gaussian blur and AWGN distortions in Tables I and II, respectively. From Tables I and II, it is clear that the networks trained on clean images perform poorly when presented with input images that are distorted even at low distortion levels.

TABLE I

Top-1 accuracy of pre-trained networks for Gaussian blur affected images. The severity of distortion increases from Level 1 to 6, where 1 is the least severe and 6 is the most severe, while clean represents undistorted images. ImageNet: $\sigma_b \in \{1, 2, 3, 4, 5, 6\}$, CIFAR-100: $\sigma_b \in \{0.5, 1, 1.5, 2.0, 2.5, 3.0\}$.

| Dataset | Clean | Distortion Level | | | | | | Avg |
| | | Level 1 | Level 2 | Level 3 | Level 4 | Level 5 | Level 6 | |
| --- | --- | --- | --- | --- | --- | --- | --- | --- |
| ImageNet | 0.5694 | 0.4456 | 0.2934 | 0.1585 | 0.0786 | 0.0427 | 0.0256 | 0.2305 |
| CIFAR-100 | 0.7028 | 0.6402 | 0.2212 | 0.0806 | 0.0440 | 0.0340 | 0.0290 | 0.2502 |

TABLE II

Top-1 accuracy of pre-trained networks for images distorted by additive white Gaussian noise. The severity of distortion increases from Level 1 to 6, where 1 is the least severe and 6 is the most severe, while clean represents undistorted images.
ImageNet: $\sigma_n \in \{10, 20, 40, 60, 80, 100\}$
CIFAR-100: $\sigma_n \in \{5, 10, 15, 20, 25, 30\}$.

| Dataset | Clean | Level 1 | Level 2 | Level 3 | Level 4 | Level 5 | Level 6 | Avg |
|---|---|---|---|---|---|---|---|---|
| ImageNet | 0.5694 | 0.5218 | 0.3742 | 0.1256 | 0.0438 | 0.0190 | 0.0090 | 0.2375 |
| CIFAR-100 | 0.7028 | 0.6184 | 0.3862 | 0.2239 | 0.1324 | 0.0829 | 0.0569 | 0.3147 |

The effect of adversarial perturbation on DNN prediction accuracy (top-1 accuracy) is also shown for various DNNs including CaffeNet, which is a single-GPU version of AlexNet (Krizhevsky et al., 2012), VGG-16 (Simonyan and Zisserman, 2014), and GoogLeNet (Szegedy et al., 2015). Specifically, we randomly choose a subset of 1000 images (1 image per class) from the ImageNet training set and add an l-infinity norm universal adversarial perturbation (generated using et al., 2017) to each image to generate adversarially perturbed images. The top-1 accuracies for perturbation-free images of this subset are 0.58, 0.69 and 0.70 for CaffeNet, VGG-16, and GoogLeNet, respectively. The top-1 accuracies for adversarially perturbed images of this same subset are significantly decreased to 0.10, 0.25 and 0.25 for CaffeNet, VGG-16, and GoogLeNet, respectively.

Ranking Filters Through Correction Priority

Although pre-trained networks perform poorly on test images with significantly different image statistics than those used to train these networks (Tables I and II), it is not obvious if only some convolutional filters in a network layer are responsible for most of the observed performance gap or if all convolutional filters in a layer contribute more or less equally to the performance degradation. If only a subset of the filters in a layer is responsible for most of the lost performance, modifying all the remaining filter activations in a DNN can be avoided. By focusing on restoring the activations of only select filters which are most susceptible to input distortions, computational resources can reduce the time involved in enhancing DNN robustness to distortions.

The output of a single convolutional filter $\phi_{i,j}$ is defined to the input $x_i$ by $\phi_{i,j}(x_i)_2$, where i and j correspond to layer number and filter number, respectively. If $g_i(\bullet)$ is a transformation that models the distortion acting on filter input $x_i$, then the output of a convolutional filter $\phi_{i,j}$ to the distortion affected input is given by $\tilde{\phi}_{i,j}(x_i) = \phi_{i,j}(g_i(x_i))$. It should be noted that $\tilde{\phi}_{i,j}(x_i)$ represents the filter activations generated by distorted inputs and $\phi_{i,j}(x_i)$ represents the filter activations for undistorted inputs. Assuming there is access to $\tilde{\phi}_{i,j}(x_i)$ for a given set of input images, replacing $\tilde{\phi}_{i,j}(x_i)$ with $\phi_{i,j}(x_i)$ in a deep network is akin to perfectly correcting the activations of the convolutional filter $\phi_{i,j}$ against input image distortions. Computing the output predictions by swapping a distortion affected filter output with its corresponding clean output for each of the ranked filters would improve classification performance. The extent of improvement in performance is indicative of the susceptibility of a particular convolutional filter to input distortion and its contribution to the associated performance degradation.

The correction priority of a convolutional filter $\phi_{i,j}$ is defined as the improvement in DNN performance on a validation set, generated by replacing $\tilde{\phi}_{i,j}(x_i)$ with $\phi_{i,j}(x_i)$ for a pre-trained network. Let the baseline performance (computed over distorted images) for a network $p_b$, which can be obtained by computing the average top-1 accuracy of the network over a set of images or another task-specific performance measure. Let $p_{swp}(i,j)$ denote the new improved performance of the network after swapping $\tilde{\phi}_{i,j}(x_i)$ with $\phi_{i,j}(x_i)$. As the implementation focuses on classification tasks, the average top-1 accuracy over a set of distorted images is used to measure $p_b$ and $p_{swp}(i,j)$. The correction priority for filter $\phi_{i,j}$ is then given by:

$$\tau(i,j) = p_{swp}(i,j) - p_b \quad (1)$$

The higher the value of $\tau(i,j)$, the more susceptible the convolutional filter $\phi_{i,j}$ is to input distortion. For computing the correction priorities, two small validation subsets are formed, one that contains 1000 images (i.e., 10 images per class) randomly sampled from the CIFAR-100 validation set for computing correction priorities for the CIFAR-100 DNN, and another one consisting of 5000 images (i.e., 5 images per class) randomly sampled from the ImageNet training set for computing correction priorities for the AlexNet DNN.

Using the ranking measure in Equation (1), correction priorities were computed for every convolutional filter in the network and the filters were ranked in descending order of correction priority. The detailed overview and pseudo-code for computing correction priorities is summarized in Algorithm 1. The correction priority for convolutional filters can be used to rank filters locally (i.e., rank only the filters within a layer) as well as globally (i.e., rank the filters across layers). The impact of both a local ranking scheme and a global ranking scheme on DNN robustness to distortions were evaluated and are described herein.

Figure 4:
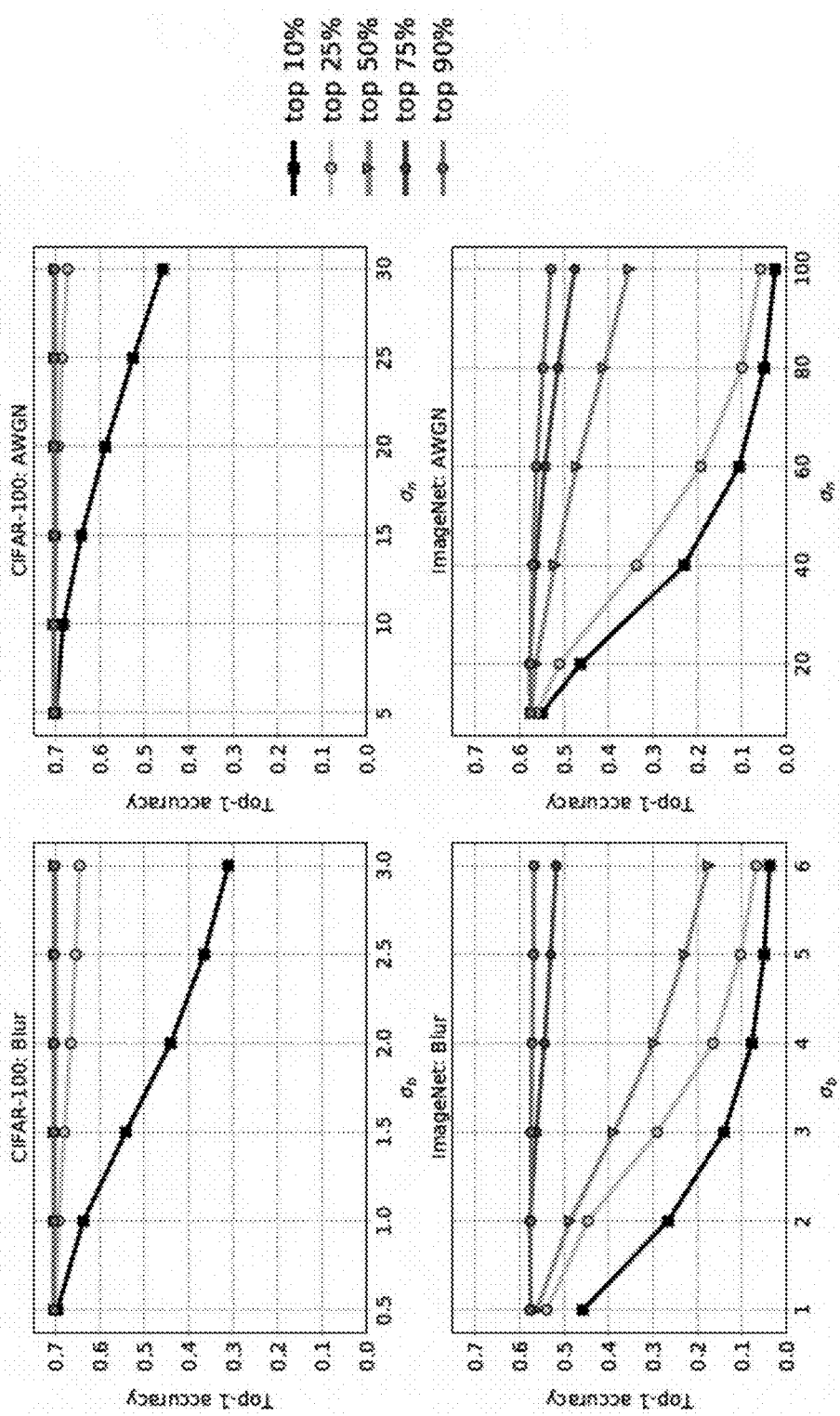
FIG. 4 is a graphical representation showing the effect of varying the percentage of corrected filter activations in the first convolutional layer of pre-trained networks, according to aspects of the present disclosure.
Figure 5:
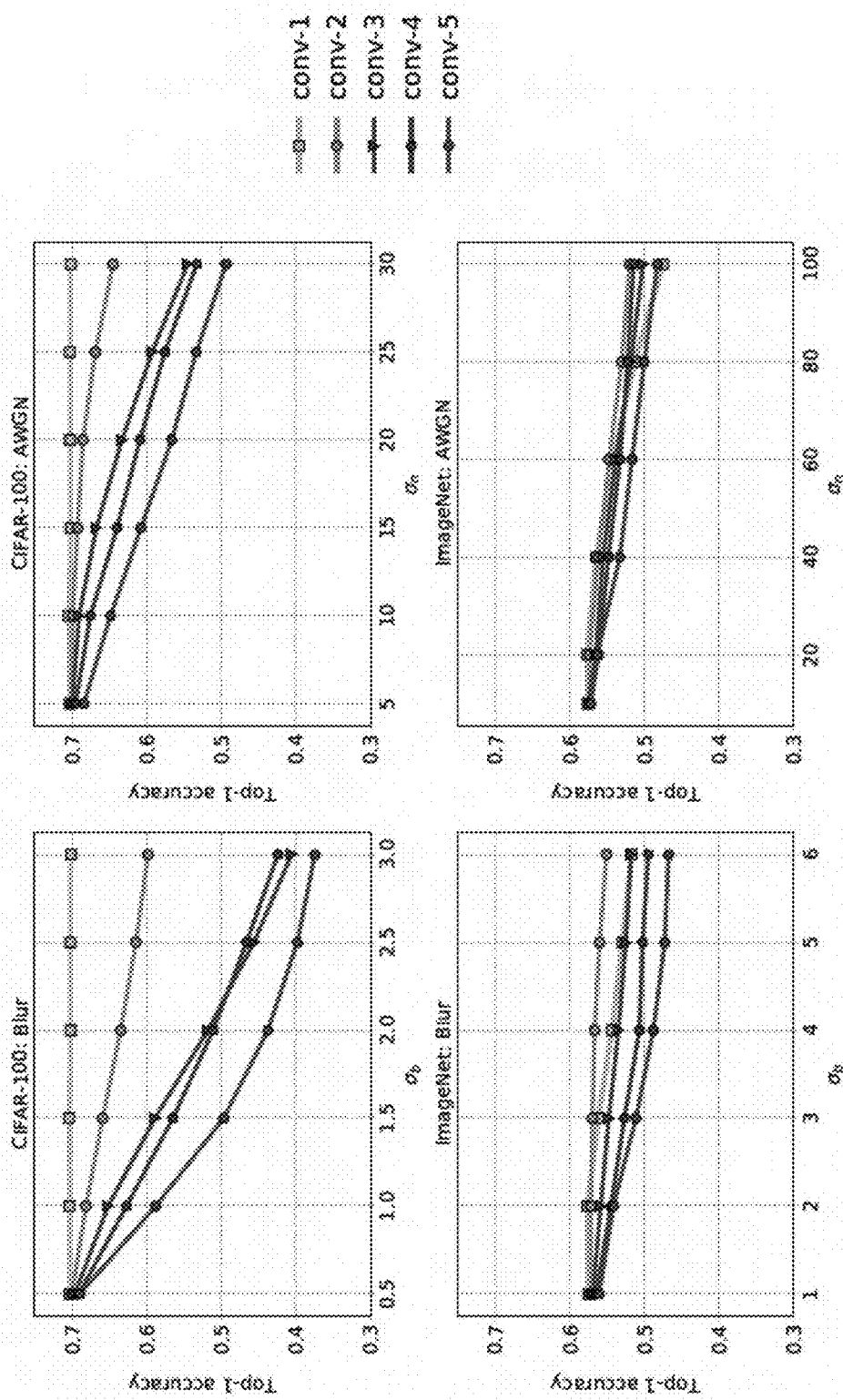
FIG. 5 is a graphical representation showing the effect of correcting $\beta_1 N_1$ filter activations in a single convolutional layer in a network, according to aspects of the present disclosure.

FIG. 4 shows the effect of correcting different percentages of the ranked filter activations ($\beta_i$) in the $i^{th}$ DNN layer. For the CIFAR-100 model, it is possible to recover a large part of the lost performance for both Gaussian blur and AWGN respectively, by correcting only 25% of the filter activations in the first layer. However, for AlexNet, the number of filter activations in the first layer that need correction is higher. An interesting observation in FIG. 4 is the relatively higher improvement in accuracy going from 50% to 75% corrected filter activations for ImageNet images affected by Gaussian blur. This can be attributed to at least some, if not most of the top 50% ranked filters being highly correlated. While ranking and choosing a subset of filters to correct, it was assumed that each filter's contribution to the final prediction accuracy is independent of the remaining filters in a layer. However in many cases, there may be high correlation between filters of a layer and the number of filters to be corrected can be further reduced by identifying the highly susceptible uncorrelated filters. Identifying the smallest set of uncorrelated distortion susceptible filters that maximize robustness to input distortion upon correction can be done through other search-based ranking techniques such as constructing graphs that show the relations between filters and finding the path that maximizes a classification-based utility function. FIG. 5 summarizes the performance of different layers of a network, obtained after correcting 50% filter outputs in the respective layer of CIFAR-100 DNN and 75% filter outputs in the respective layer of AlexNet. For both CIFAR-100 and ImageNet models, the best performance was achieved by correcting filter activations in the early convolutional layers (i.e., conv-1 for CIFAR-100 model and conv-2 for AlexNet). It was found that going deeper in the network accuracy diminishes for correcting a fixed percentage of filter outputs. This indicates that, going deeper in the network, all the convolutional filters become more or less equally susceptible to distortion.

Figure 6A:
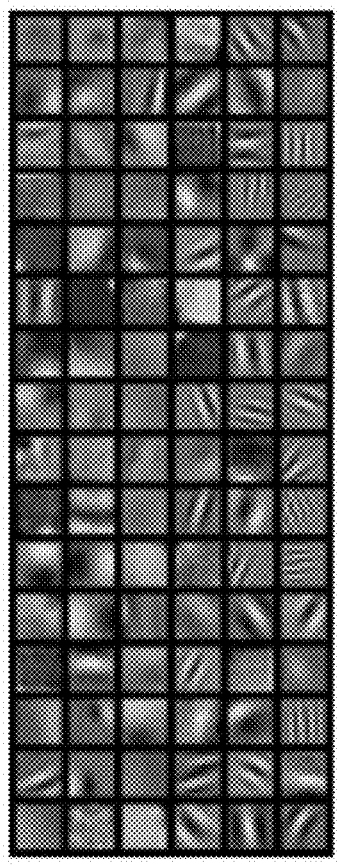
FIGS. 6A-6C are images of convolutional filter kernels in the first convolutional layer, according to aspects of the present disclosure.
Figure 6B:
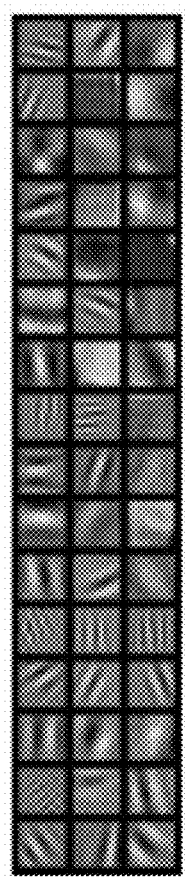
Figure 6C:
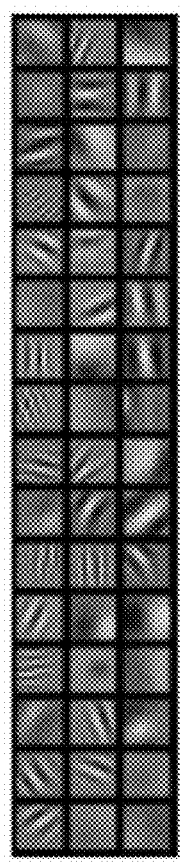

Convolutional filter visualizations from the first layer of the pre-trained AlexNet model (FIG. 6A) reveal two types of filter kernels: 1) mostly color agnostic, frequency- and orientation-selective filters that capture edges and object contours and 2) color specific blob shaped filters that are sensitive to specific color combinations. FIGS. 6B and 6C, visualize the top 50% filters in the first convolutional layer of AlexNet, that are most susceptible to Gaussian blur and AWGN, respectively, as identified by the proposed ranking metric. The identified filters most susceptible to Gaussian blur are mainly frequency- and orientation-selective filters, most of which are color agnostic, while filters most susceptible to AWGN were a mix of both color specific blobs and frequency- and orientation-selective filters. This was in line with the intuitive understanding that Gaussian blur majorly affects edges and object contours and not object color, while AWGN affects color as well as object contours.

---

Algorithm 1: Computing Correction Priority

Given input triplets
$(x_{1,i}, g_i(x_{1,i}), y_1), \ldots, (x_{M,i}, g_i(x_{M,i}), y_M)$ with $1 \leq i \leq L$,
 where i represents the layer number, $x_{m,i}$ is the $m^{th}$
 undistorted input for layer i and $g_i(x_{m,i})$ is the
 corresponding distorted version, M is the total number of
 images in the validation set and $y_m$ is the ground-truth label
 for the $m^{th}$ input image.
$p_b = 0$
for m = 1 to M do
|    predict class label ypred$_m$ for distorted input image
|    $g_1(x_{m,1})$
|
|    $p_b = p_b + \frac{1}{M} h(y_m, ypred_m)$
|
|    where h(y$_m$, ypred$_m$) = 1, if y$_m$ = ypred$_m$ and 0
|    otherwise.
end
for i = 1 to L do
|    N$_i$: number of filters in layer i
|    $\phi_{i,j}$ is a convolutional filter, where j is the filter number
|    and i is the layer number
|    for j = 1 to N$_i$ do
| |    $p_{swp}(j) = 0$
| |    for m = 1 to M do
| | |    swap distorted filter output with clean output,
| | |    $\phi_{i,j}(g_i(x_{m,i})) \leftarrow \phi_{i,j}(x_{m,i})$
| | |    predict class label ypred$_m$
|
| | |    $p_{swp}(j) = p_{swp}(j) + \frac{1}{M} h(y_m, ypred_m)$
|
| | |    where h(y$_m$, ypred$_m$) = 1, if y$_m$ = ypred$_m$ and 0
| | |    otherwise.
| |    end
| |    $\tau(i, j) = p_{swp}(j) - p_b$
|    end
end

---

Ranking Filters Through Filter Weights

In addition to the aforementioned procedure for ranking filters based on classification gain or correction priority, filters can be ranked based on their weights. For example, for adversarial perturbations, it can be shown that filters with higher weights are more susceptible to adversarial perturbations than filters with smaller weights. An l-1 norm of the filter weights or, more generally, an l-p norm $0 \leq p \leq 1$ of the filter weights can be used to compute a single weight score and to rank the filters: the higher the weight norm, the more susceptible the corresponding filter is to perturbations.

For a given layer, let $\phi_m(u)$ be the output (activation map) of the mth convolutional filter with kernel weights represented by the tensor (3-dimensional array) $W_m$ for an input u. Let $e_m = \phi_m(u+r) - \phi_m(u)$ be the additive noise (perturbation) that is caused in the output activation map $\phi_m(u)$ as a result of applying an additive perturbation r to the input u. It can be shown that $e_m$ is bounded as follows:

$$\|e_m\|_\infty \leq \|W_m\|_1 \|r\|_p \qquad (2)$$

where $\|.\|_p$ is the l-p norm, $0 \leq p \leq 1$, and $\|W_m\|_1$ is the l1-norm (sum of the absolute values) of the filter weights.

Figure 14:
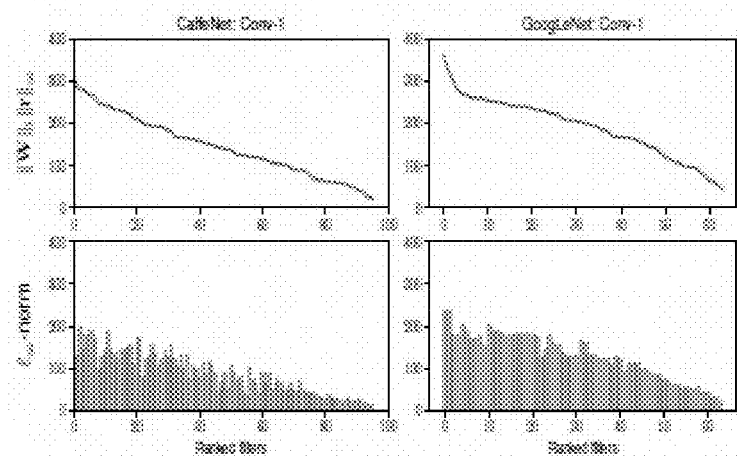
FIG. 14 is an illustration showing ranking of the convolutional filters based on the $l_1$-norm of the filter weights and the max level of distortion that is induced in the ranked filters' output.
Figure 17:
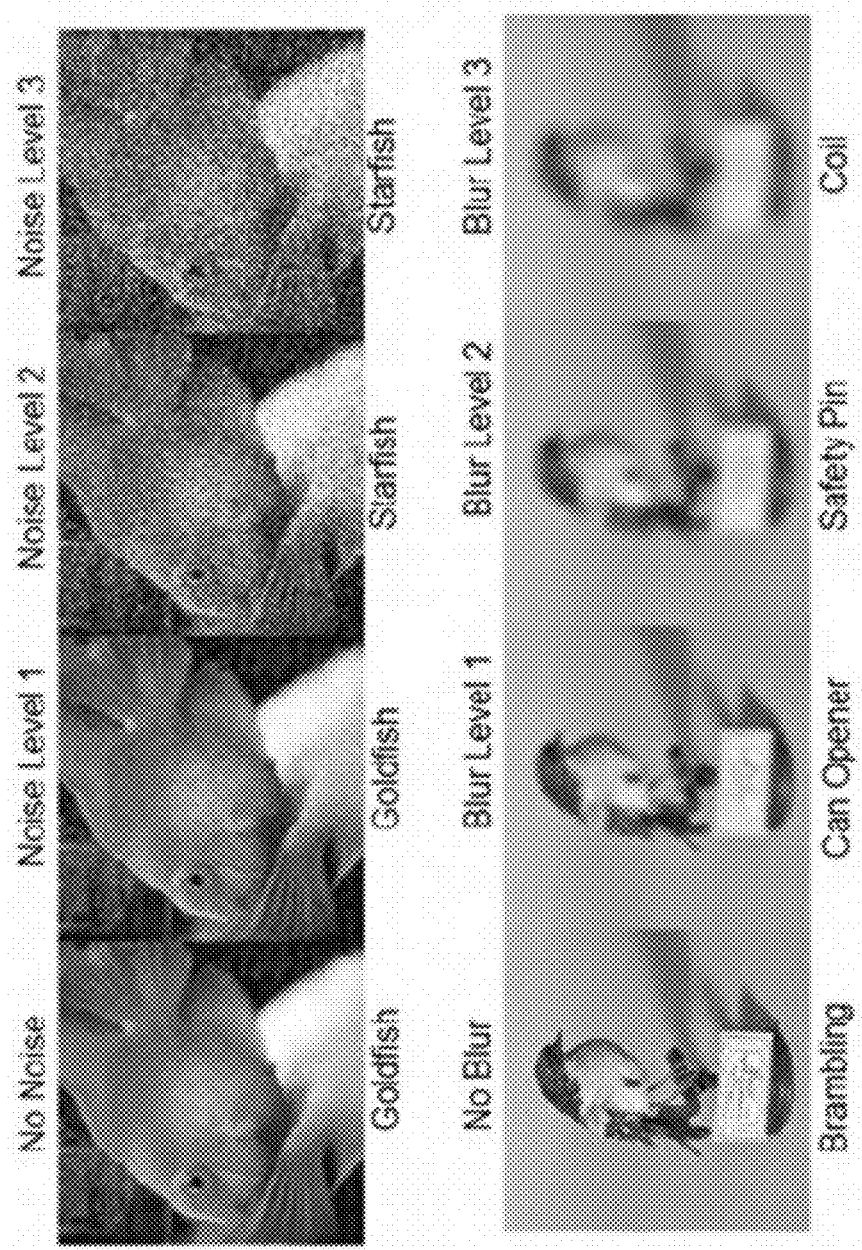
FIG. 17 are images showing the effect of image quality of DNN predictions when using an AlexNet model trained on high-resolution images, according to aspects of the present disclosure.

Equation 2 shows that the l-1 norm of the filter weights can be used to identify and rank convolutional filter activations in terms of their ability to restrict perturbation in their activation maps. For example, filters with a small weight l-1 norm would result in insignificant small perturbations in their output when their input is perturbed, and are thus considered to be less vulnerable to perturbations in the input. FIG. 14 shows observed norms in the first convolution layer of CaffeNet and GoogLeNet for an l-infinity norm universal adversarial input. The adversarial input was obtained by adding a universal adversarial perturbation, generated using the method of (Moosavi-Dezfooli et al., 2017), to the clean image. It can be seen that filter ranking based on the filter weights (l1-norm of the weights is shown in FIG. 14 17 correlates well with the degree of perturbation (max level) that is induced in the filter outputs. Similar observations can be made for other convolutional layers in the network.

Correcting Ranked Filter Outputs

Figure 7:
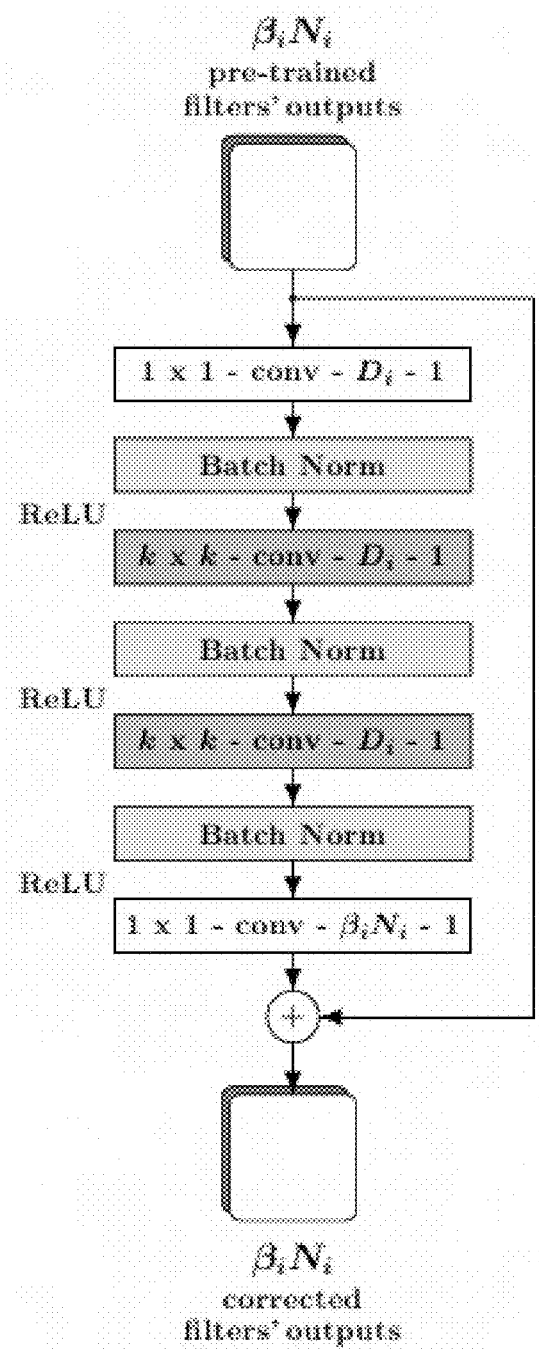
FIG. 7 is a flow chart showing a correction unit based on a residual function acting on outputs of $\beta_i N_i$ filters out of $N_i$ total filters in the $i^{th}$ convolutional layer of a pre-trained DNN, according to aspects of the present disclosure.

In the DeepCorrect framework, a task-driven corrective transform acts as a distortion masker for convolutional filters or features of those filters that are most susceptible to input distortion, while leaving all the other pre-trained filter outputs in the layer unchanged. Let $R_i$ represent a set consisting of the Ni ranked filter indices in the $i^{th}$ layer of the network, computed described herein. Also let $R_{i,\beta_i}$ represent a subset of $R_i$ consisting of the top $\beta_i N_i$ ranked filter indices in network layer i, where $N_i$ is the total number of convolutional filters in layer i and $\beta_i$ is the percentage of filters corrected in layer i, as defined herein. If $\Phi_i$ represents the set of convolutional filters in the $i^{th}$ layer, the objective is to learn a transform $F_{corr_i}(:)$ such that:

$$F_{corr_i}(\Phi_{R_i,\beta_i}(g_i(x_i))) \approx \Phi_{R_i,\beta_i}(x_i) \qquad (3)$$

where $x_i$ is the undistorted input to the $i^{th}$ layer of convolutional filters and $g_i(\bullet)$ is a transformation that models the distortion acting on $x_i$. Since no specific form for the image distortion process is assumed, in one embodiment of this invention the corrective transform $F_{corr_i}(:)$ takes the form of a shallow residual block, which is a small stack of convolutional layers (4 layers) with a single skip connection, such as the one shown in FIG. 7. As used herein, a residual block is referred to as a correction unit. $F_{corr_i}(:)$ can now be estimated using a target-oriented loss such as the one used to train the original network, through backpropagation, but with much less number of parameters.

Consider an L layered DNN Φ that has been pre-trained for an image classification task using clean images. Φ can be interpreted as a function that maps network input x to an output vector $\Phi(x) \in \mathbb{R}^d$, such that:

$$\Phi = \Phi_L \circ \Phi_{L-1} \circ \ldots \Phi_2 \circ \Phi_1 \qquad (4)$$

where $\Phi_i$ is the mapping function (set of convolutional filters) representing the $i^{th}$ DNN layer and d is the dimensionality of the network output.

Figure 8A:
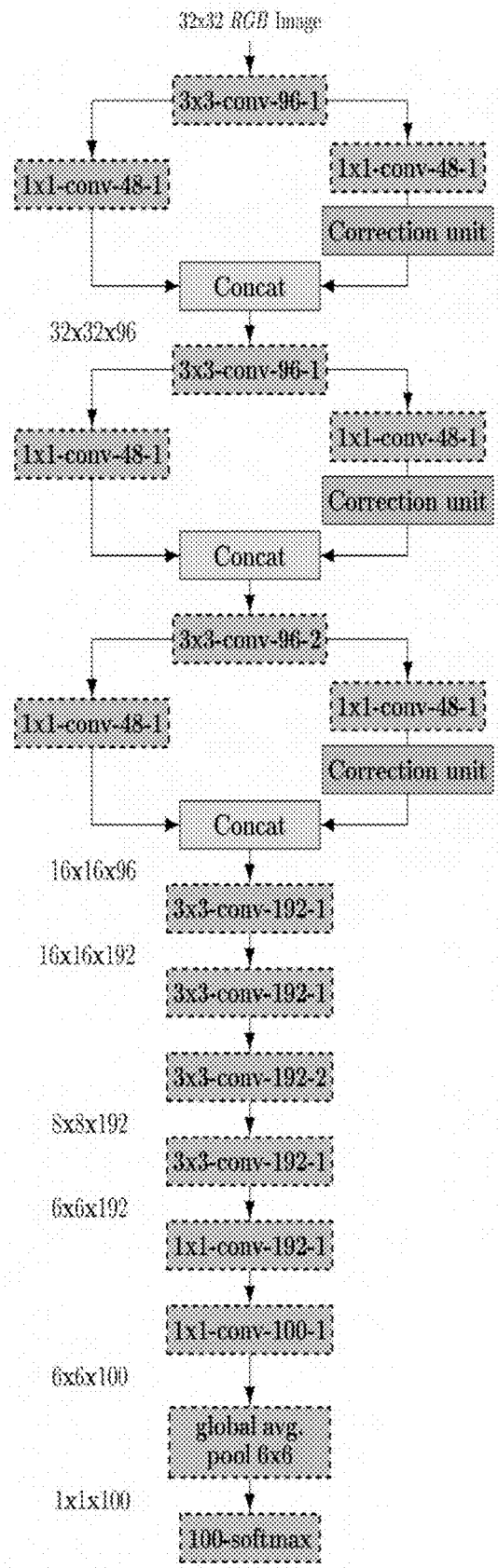
FIGS. 8A and 8B are examples of models for CIFAR-100 and ImageNet datasets, according to aspects of the present disclosure.
Figure 8B:
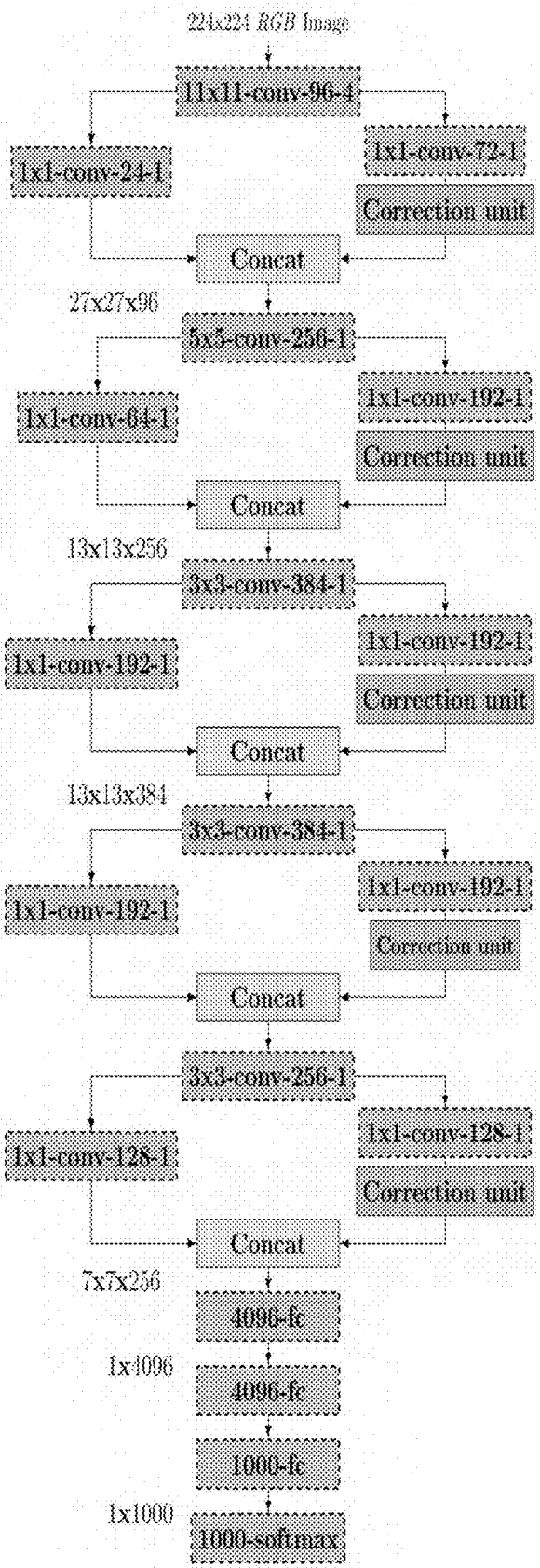

Without loss of generality, if a correction unit is added that acts on the top $\beta_i N_i$ ranked filters in the first network layer, then the resultant network $\Phi_{corr}$ is given by:

$$\Phi_{corr} = \Phi_L \circ \Phi_{L-1} \circ \ldots \circ \Phi_2 \circ \Phi_{1corr} \qquad (5)$$

where $\Phi_{1corr}$ represents the new mapping function for the first layer, in which the corrective transform $F_{corr_i}(:)$ acts on the activations of the filter subset $^\Phi R_{1,\beta_i}$ and all the remaining filter activations are left unchanged. If $W_1$ represents the trainable parameters in $F_{corr_1}$, then $F_{corr_1}$ can be estimated by minimizing:

$$E(W_1) = \lambda \mathscr{R}(W_1) + \frac{1}{M}\sum_{m=1}^{M}\mathscr{L}(y_m, \Phi_{corr}(x_m)) \qquad (6)$$

where λ, $\mathscr{R}$ is a constant, is a regularizer such as $l_1$ norm or $l_2$ norm, $\mathscr{L}$ is a standard cross-entropy classification loss, $y_m$ is the target output label for the $m^{th}$ input image $x_m$, M represents the total number of images in the training set. Since both train on a collection of both distorted and clean images, $x_m$ represents a clean or a distorted image. The trainable parameters in Equation (5) are $W_1$, while all other network parameters are fixed and kept the same as those in the pre-trained models. Although Equation (6) shows correction unit estimation for only the first layer, it is possible to add such units at the output of distortion susceptible filters in any layer and in one or more layers. FIGS. 8A-8B show examples of DeepCorrect models for the pre-trained networks in FIG. 3.

Experimental Results for Gaussian Blur and Noise Distortions

The DeepCorrect framework and the most obvious fine-tuning baseline models were evaluated to distortion affected distributions on the two datasets and architectures described herein. The DNN models were trained and tested using the python-based deep learning framework Keras and a single Nvidia Titan-X GPU. The classification performance was evaluated independently for each type of distortion. Although the classification accuracy for each distortion level was reported separately, for both the DeepCorrect framework and fine-tuning baseline models, a single model that was used to classify images affected by different levels of distortion including the undistorted images was learnt. Unlike common image denoising and deblurring methods like BM3D and NCSR which expect the distortion/noise severity to be known or other preprocessing methods that assume knowledge of the sensor characteristics/image formation model or learning-based methods that train separate models for each noise/distortion severity, the DeepCorrect framework-based models were totally blind to the severity of distortion added to a test image.

CIFAR-100 Analysis
Fine-Tuned Models

The CIFAR-100 pre-trained model was fine-tuned as shown in FIG. 3A on a mix of distortion affected images and clean images. Similar to the procedure followed by Vasiljevic et al., a mini-batch size of 250 samples was used, such that half of the input samples in each mini-batch are randomly chosen and distorted with a distortion level that is also chosen randomly. Starting with an initial learning rate that is ten times lower than the initial learning rate used to generate the pre-trained model, i.e., 0.01, and momentum equal to 0.9, network parameters in various layers are updated for a fixed number of iterations (40 epochs), with the learning rate reduced by a factor of 10 after every 10 epochs. A data augmentation method similar to He et al. (2016) was used.

As shown in Tables III and IV, the effect of varying the number of layers that were fine-tuned in a pre-trained network by generating numerous fine-tuned models which were parameterized by Finetune-k, where k represents the number of convolutional layers that were fine-tuned, starting from the input was evaluated. The rest of the layers are left unchanged from a pre-trained model. For Gaussian blur affected images, fine-tuning parameters in all layers (Finetune-9) achieves the highest accuracy among all fine-tuned models, whereas Finetune-6, Finetune-3 and Finetune-1 can achieve ≈98%, 87% and 60% of this accuracy. A similar trend is seen for AWGN and this implies that fine-tuning just a few layers in a DNN is insufficient to make a network robust to distortion.

DeepCorrect Models

Similar to the Finetune-k model variants, numerous Deep-Correct models can be generated by varying the number of network layers to be corrected, starting from the input, and by applying in these layers, correction units (FIG. 7) at the output of the ranked distortion susceptible filters of the pre-trained model (FIG. 3A); as discussed herein, these filters are identified based on the correction priority computed using Algorithm 1. Parameterized DeepCorrect models given by Deepcorr-k were formulated where k represents the number of corrected convolutional layers, starting from the first convolutional layer with 1<k≤6. In each corrected layer, the activations of only $\beta_i N_i$ filters are corrected while leaving all remaining filters' activations unchanged, with $\beta_i$ being the percentage of filter activations corrected and Ni being the total number of convolutional filters in DNN layer i. For example, FIGS. 8A and 8B show Deepcorr-3. The value for βi is chosen to be 0.5, i.e., 50% filter activations are corrected per layer. The correction priority computed using Algorithm 1 is used to independently rank the distortion susceptible filters within each layer (local ranking) and correct the activations of the top 50% filters in each layer. For each one of the Deepcorr-k models, a corresponding model is generated named Deepcorr-kc, where all parameters in the last 3 convolutional layers are also updated in addition to the trainable parameters of the respective Deep-corr-k model. All DeepCorrect models are trained as described herein, using an initial learning rate of 0.1 and the same learning rate schedule, data augmentation and total iterations used for generating the fine-tuned models.

TABLE III

Top-1 accuracy of various models for Gaussian blur affected images of the CIFAR-100 test set. Bold numbers show best accuracy and underlined numbers show next best accuracy for each distortion level.

| | Distortion Level | | | | | | | | |
|---|---|---|---|---|---|---|---|---|---|
| Method | $\sigma_b = 0$ | $\sigma_b = 0.5$ | $\sigma_b = 1$ | $\sigma_b = 1.5$ | $\sigma_b = 2.0$ | $\sigma_b = 2.0$ | $\sigma_b = 3$ | Avg | # Params |
| Baseline | 0.7028 | 0.6402 | 0.2212 | 0.0806 | 0.0440 | 0.0340 | 0.0290 | 0.2502 | 1,389,804 |
| Finetune-1 | 0.6310 | 0.6254 | 0.4664 | 0.2824 | 0.1694 | 0.1139 | 0.0761 | 0.3378 | 2,880 |
| Finetune-3 | 0.6642 | 0.6573 | 0.5905 | 05196 | 0.4291 | 0.3431 | 0.2678 | 0.4955 | 169,344 |
| Finetune-6 | 0.6887 | 0.6841 | 0.6266 | 0.5702 | 0.5088 | 0.4544 | 0.3931 | 0.5608 | 1,000,512 |
| Finetune-9 | 0.6875 | 0.6808 | 0.6296 | 0.5789 | 0.5297 | 0.4812 | 0.4218 | 0.5727 | 1,389,804 |
| Deepcorr-1 | 0.6746 | 0.6500 | 0.5787 | 0.5217 | 0.4307 | 0.3395 | 0.2466 | 0.4917 | 80,954 |
| Deepcorr-3 | 0.6890 | 0.6781 | 0.6414 | 0.5944 | 0.5441 | 0.4769 | 0.4007 | 0.5749 | 242,862 |
| Deepcorr-6 | <u>0.6963</u> | <u>0.6871</u> | <u>0.6548</u> | <u>0.6116</u> | <u>0.5638</u> | <u>0.5128</u> | <u>0.4405</u> | <u>0.5952</u> | 505,674 |
| Deepcorr-1c | 0.6893 | 0.6806 | 0.6344 | 0.5905 | 0.5253 | 0.4643 | 0.3961 | 0.5686 | 470,246 |
| Deepcorr-3c | 0.6947 | <u>0.6871</u> | 0.6515 | 0.6033 | 0.5617 | 0.5086 | <u>0.4456</u> | 0.5932 | 632,154 |
| Deepcorr-6c | 0.6937 | 0.6874 | 0.6552 | 0.6118 | 0.5720 | 0.5269 | 0.4694 | 0.6023 | 894,966 |

TABLE IV

Top-1 accuracy of various models for AWGN affected images of the CIFAR-100 test set. Bold numbers show best accuracy and underlined numbers show next best accuracy for each distortion level.

| | Distortion Level | | | | | | | | |
|---|---|---|---|---|---|---|---|---|---|
| Method | $\sigma_n = 0$ | $\sigma_n = 5$ | $\sigma_n = 10$ | $\sigma_n = 15$ | $\sigma_n = 20$ | $\sigma_n = 25$ | $\sigma_n = 30$ | Avg | # Params |
| Baseline | 0.7028 | 0.6184 | 0.3862 | 0.2239 | 0.1324 | 0.0829 | 0.0569 | 0.3147 | 1,389,804 |
| Finetune-1 | 0.6358 | 0.6391 | 0.6257 | 0.5859 | 0.5213 | 0.4571 | 0.3760 | 0.5487 | 2,880 |
| Finetune-3 | 0.6832 | 0.6771 | 0.6588 | 0.6329 | 0.6070 | 0.5694 | 0.5220 | 0.6214 | 169,344 |
| Finetune-6 | 0.6843 | 0.6845 | 0.6687 | 0.6465 | 0.6245 | 0.5940 | 0.5593 | 0.6374 | 1,000,512 |
| Finetune-9 | 0.6876 | 0.6838 | 0.6719 | 0.6562 | 0.6317 | 0.6104 | <u>0.5742</u> | <u>0.6451</u> | 1,389,804 |
| Deepcorr-1 | 0.6930 | 0.6802 | 0.6612 | 0.6339 | 0.6030 | 0.5688 | 0.5330 | 0.6247 | 80,954 |
| Deepcorr-3 | 0.6932 | 0.6846 | 0.6732 | 0.6436 | 0.6181 | 0.5914 | 0.5604 | 0.6377 | 242,862 |
| Deepcorr-6 | <u>0.6964</u> | 0.6903 | <u>0.6769</u> | 0.6496 | 0.6277 | 0.5986 | 0.5679 | 0.6439 | 505,674 |
| Deepcorr-1c | 0.6952 | 0.6864 | 0.6715 | 0.6467 | 0.6260 | 0.5985 | 0.5642 | 0.6412 | 470,246 |
| Deepcorr-3c | <u>0.6964</u> | <u>0.6893</u> | 0.6776 | <u>0.6512</u> | 0.6290 | 0.6010 | 0.5923 | 0.6452 | 632,154 |
| Deepcorr-6c | 0.6930 | 0.6879 | 0.6727 | 0.6484 | <u>0.6304</u> | <u>0.6084</u> | 0.5757 | 0.6452 | 894,966 |

As shown in Tables III and IV, Deepcorr-1, Deepcorr-3 and Deepcorr-6 consistently outperformed their fine-tuned model counterparts, i.e., Finetune-1, Finetune-3 and Finetune-6, for both Gaussian blur and AWGN. For Gaussian blur, Deepcorr-1, Deepcorr-3 and Deepcorr-6 achieve ≈46%, 16% and 6% improvement in average accuracy relative to Finetune-1, Finetune-3 and Finetune-6, respectively, while for AWGN the relative improvement in respective average accuracy is ≈14%, 3% and 1%.

Finally in Table V, the effect of using a global ranking approach for Deepcorr-6c was evaluated, where the correction priority computed was used employing Algorithm 1 to rank filters across all six convolutional layers and identify the top 50% distortion susceptible filters among them. By correcting the same number of total filter activations as the local ranking approach (432 filters out of 864), it was observed that the global ranking approach marginally outperforms the local ranking approach. A paired sample t-test between the local and global ranking accuracies yielded a p-value of 0.2151 (>0.05), i.e., the difference between the global and local ranking accuracies was not statistically significant.

TABLE V

Top-1 accuracy of the Deepcorr-6c model for the CIFAR-100 test set, with filter outputs for the correction chosen using either a local or global ranking approach. Performance is reported in terms of Top-1 accuracy averaged over all distortion levels, including original images.

| Filter ranking | Gaussian blur | AWGN |
|---|---|---|
| Local | 0.6023 | 0.6452 |
| | # corrected per layer | # corrected per layer |
| | {48, 48, 48, 96, 96, 96} | {48, 48, 48, 96, 96, 96} |
| Global | 0.6025 | 0.6467 |
| | # corrected per layer | # corrected per layer |
| | {33, 46, 75, 95, 90, 93} | {30, 44, 61, 103, 99, 95} |

Correcting Ranked Filters Vs. Random Filters

The impact of the ranking metric described herein was assessed on the performance of the Deepcorr-1 model by training correction units on: 1) $\beta_i N_i$ filters most susceptible to distortion, as identified by the ranking metric and 2) random subset of $\beta_i N_i$ convolutional filters, where $\beta_i$ and $N_1$, as defined in herein, represents the percentage of filters corrected in the first layer and the total number of filters in the first layer, respectively. For this analysis, DNN accuracy is evaluated for correcting 6, 12, 24, and 48 filters out of the 96 filters in the first convolutional layer, i.e. $\beta_i \in \{6.25\%, 12.5\%, 25\%, 50\%\}$.

Figure 9:
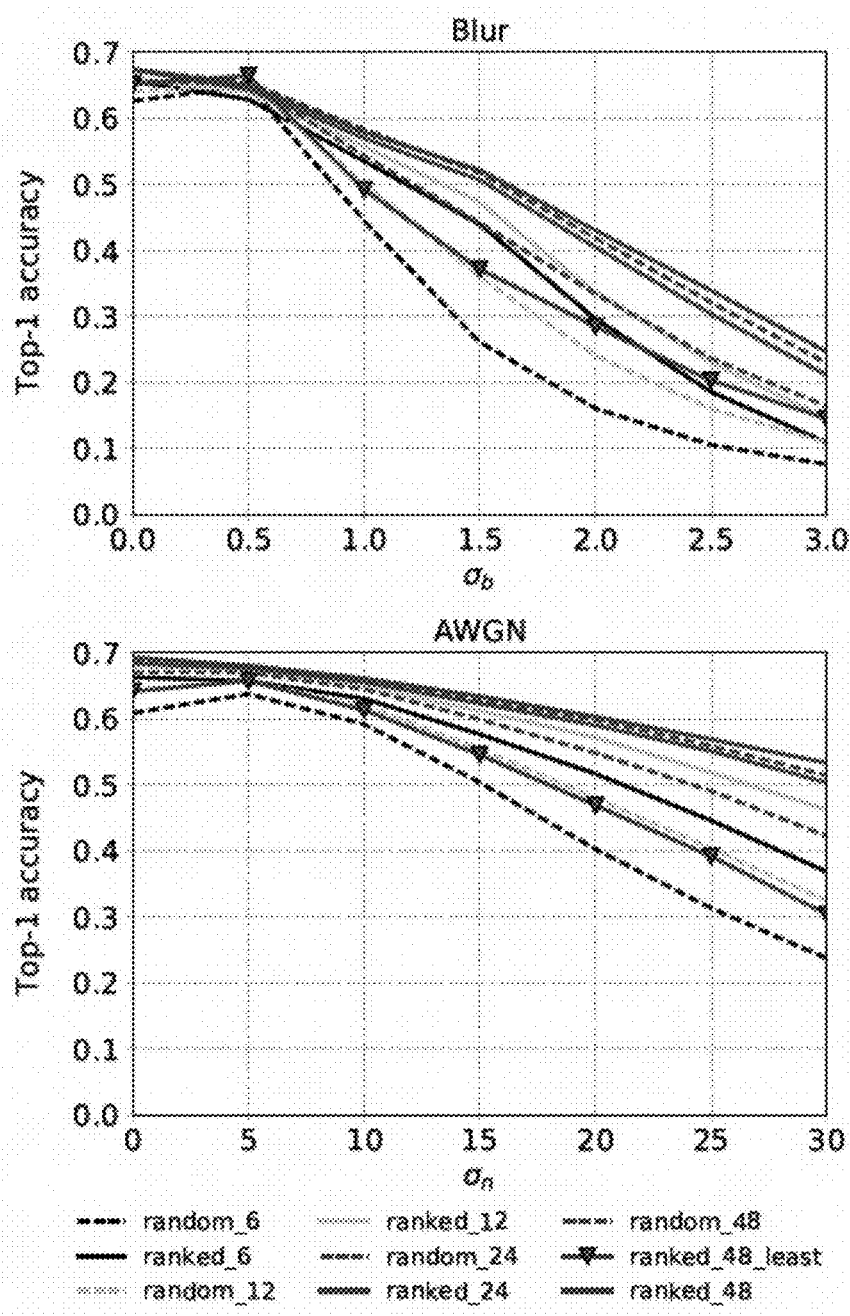
FIG. 9 is a graphical representation showing the corrected ranked filter outputs vs. randomly chosen filter outputs in the first convolutional model of the CIFAR-100 model, according to aspects of the present disclosure.

FIG. 9 shows the impact of the proposed ranking metric on the performance of Deepcorr-1 for varying number of corrected filters ($\beta_i N_1$), with models correcting ranked filter outputs represented by ranked_l (solid line) and models correcting a randomly chosen set of filter outputs represented by random_l (dashed line), where l is the number of corrected filters. Ten trials for choosing different random subsets of filter outputs to be corrected were performed as shown in FIG. 9, the accuracy averaged over 10 trials, for each level of distortion and type. For a fixed number of corrected filter outputs, adding correction units at the output of ranked distortion susceptible filters achieves higher accuracy as compared to adding correction units at the output of randomly chosen filters in a convolutional layer.

TABLE VI

Table 6. P-values for paired sample t-test between the ranked_/ and random_/ models for l ∈ {6, 12, 24, 48}.

| 6 filters | 12 filters | 24 filters | 48 filters |
|---|---|---|---|
| 0.0001 | 0.00014 | 0.0002 | 0.0119 |

Interestingly, it was observed that in each of the 10 trails for the random_48 model, at least some of the filters chosen for correction are also present in the set of the 48 most distortion susceptible filters (50%) identified by the proposed ranking measure. For the case where 50% filter outputs are corrected in Deepcorr-1, if the superior performance of the DeepCorrect framework was only due to the additional network parameters provided by the correction unit, then re-training the correction unit on the 50% least susceptible filter outputs should also achieve the same performance as that achieved by applying a correction unit on the 50% most susceptible filter outputs identified by the ranking metric. To this end, the accuracy for correcting the outputs of the 48 least distortion susceptible filters in the first layer of a pre-trained AlexNet, represented by ranked 48 least in FIG. 9, was also reported As shown in FIG. 9, the performance of the ranked 48 least model is significantly poorer than the proposed ranked 48 model, which corrects activations of the most susceptible filters. The ranked 48 least model can be seen as a lower bound on the accuracy of the random 48 model, thus highlighting the importance of ranking filters in a convolutional layer on the basis of susceptibility to image distortions and correcting the most susceptible ones. As shown in Table VI (Table 6), p-values for paired sample t-tests between random_l and ranked_l model performances are all lesser than 0.05, indicating the difference in accuracy is statistically significant.

ImageNet Analysis
Fine-Tuned Model

Since fine-tuning all layers of a DNN results in the best accuracy for fine-tuned models (Tables III and IV), all layers of the AlexNet model in FIG. 3B was fine-tuned on a mix of distortion affected images and clean images to generate a single fine-tuned model and refer to this model as Finetune-8 using the notation defined herein. Similar to the fine-tuning procedure described herein, starting with an initial learning rate that is 10 times lower than that used to generate the pre-trained model in FIG. 3B (0.001), momentum equal to 0.9 and batch size of 256, network parameters (60.94 million) are updated for a fixed number of iterations (62500 iterations≈10 epochs), with the learning rate reduced by a factor of 10 after every 18750 iterations (roughly 3 epochs). A data augmentation method is used as proposed by He et al (2016).

TABLE VII

Top-1 accuracy of various models for Gaussian blur affected images of the ImageNet validation set (ILSVRC2012). Bold numbers show best accuracy and underlined numbers show next best accuracy for each distortion level.

| | Distortion Level | | | | | | | | # Params |
|---|---|---|---|---|---|---|---|---|---|
| Method | $\sigma_b = 0$ | $\sigma_b = 1$ | $\sigma_b = 2$ | $\sigma_b = 3$ | $\sigma_b = 4$ | $\sigma_b = 5$ | $\sigma_b = 6$ | Avg | (millions) |
| Baseline | 0.5694 | 0.4456 | 0.2934 | 0.1585 | 0.0786 | 0.0427 | 0.0256 | 0.2305 | 60.96 |
| Finetune-8 | 0.5553 | 0.5301 | 0.5004 | 0.4669 | 0.4276 | 0.3886 | 0.3485 | 0.4596 | 60.96 |
| Deepcorr-5c | 0.5684 | 0.5513 | 0.5300 | 0.5173 | 0.5011 | 0.4748 | 0.4519 | 0.5135 | 61.44 |
| Deepcorr-5 | 0.5724 | 0.5522 | 0.5240 | 0.5100 | 0.4937 | 0.4643 | 0.4334 | 0.5071 | 2.81 |
| Deepcorr-5c-no-bn | 0.5647 | 0.5396 | 0.5000 | 0.4773 | 0.4524 | 0.4257 | 0.3921 | 0.4788 | 2.80 |
| NCSR | 0.5694 | 0.4553 | 0.2897 | 0.1263 | 0.0578 | 0.0259 | 0.0107 | 0.2193 | — |

TABLE VIII

Top-1 accuracy of various models for AWGN affected images of the ImageNet validation set (ILSVRC2012). Bold numbers show best accuracy and underlined numbers show next best accuracy for each distortion level.

| | Distortion Level | | | | | | | | # Params |
|---|---|---|---|---|---|---|---|---|---|
| Method | $\sigma_n = 0$ | $\sigma_n = 10$ | $\sigma_n = 20$ | $\sigma_n = 40$ | $\sigma_n = 60$ | $\sigma_n = 80$ | $\sigma_n = 100$ | Avg | (millions) |
| Baseline | 0.5694 | 0.5218 | 0.3742 | 0.1256 | 0.0438 | 0.0190 | 0.0090 | 0.2375 | 60.96 |
| Finetune-8 | 0.5540 | 0.5477 | 0.5345 | 0.5012 | 0.4654 | 0.4297 | 0.3936 | 0.4894 | 60.96 |
| Deepcorr-5c | 0.5657 | 0.5598 | 0.5496 | 0.5235 | 0.4942 | 0.4623 | 0.4320 | 0.5124 | 61.44 |
| Deepcorr-5 | 0.5712 | 0.5660 | 0.5546 | 0.5213 | 0.4870 | 0.4509 | 0.4138 | 0.5092 | 2.81 |
| Deepcorr-5c-no-bn | 0.5663 | 0.5601 | 0.5463 | 0.5145 | 0.4791 | 0.4453 | 0.4076 | 0.5027 | 2.80 |
| BM3D | 0.5694 | 0.5638 | 0.5539 | 0.5113 | 0.4749 | 0.4435 | 0.4047 | 0.5032 | — |

DeepCorrect Models

The main DeepCorrect model for ImageNet shown in FIG. 8b is generated by correcting $\beta_i N_i$ ranked distortion susceptible filters in the first 5 layers out of the 8 layered pre-trained AlexNet DNN shown in FIG. 3b and referred to as Deepcorr-5 in Tables VII-VIII, using the notation defined in Section 5.1. Deepcorr-5 is generated by correcting 75% ranked filter outputs in the first two layers ($\beta_1$, $\beta_2$=0.75) and 50% ranked filter outputs in the next three layers ($\beta_3$, $\beta_4$, $\beta_5$=0.5). The correction priority computed using Algorithm 1 is used to independently rank the distortion susceptible filters within each layer (local ranking) and correct the activations of the top $\beta_i N_i$ filters in each layer. The correction units (FIG. 7) in each convolutional layer are trained using an initial learning rate of 0.1 and the same learning rate schedule, data augmentation and total iterations used for generating the Finetune-8 model as described herein. Additional details regarding the correction unit architecture for Deepcorr-5 can be found in Table X. Two additional variants were also generated based on the Deepcorr-5 model: 1) Deepcorr-5c, wherein parameters in the final three fully connected layers are also updated and 2) Deepcorr-5-no-bn, which is a Deepcorr-5 architecture without any batch normalization in the correction units.

Figure 2:
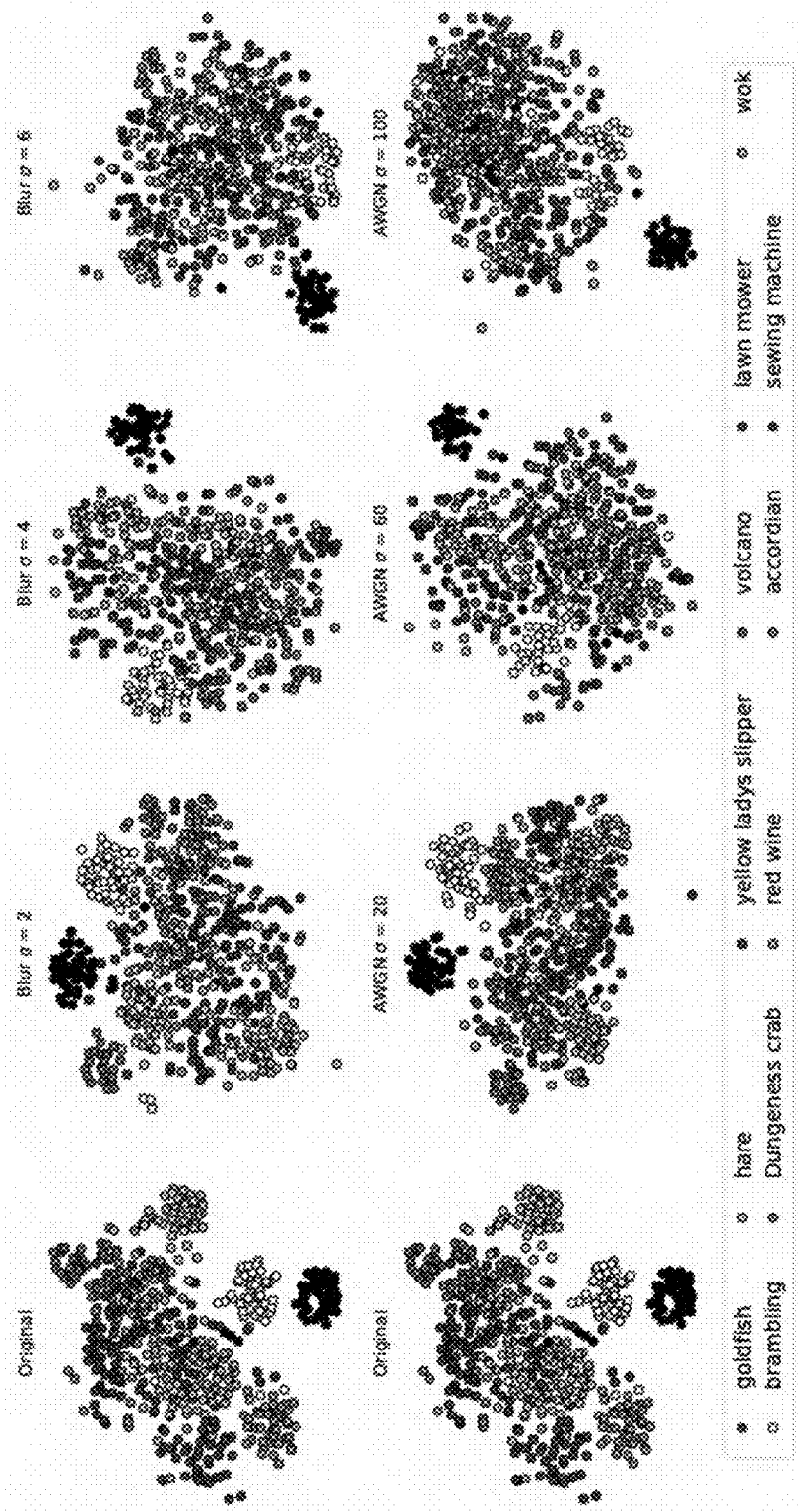
FIG. 2 is an illustration showing the effect of image quality on the discriminative power of the features learnt by a DNN from high quality images, through t-SNE embeddings of object classes affected by different types and levels of distortion.
Figure 10:
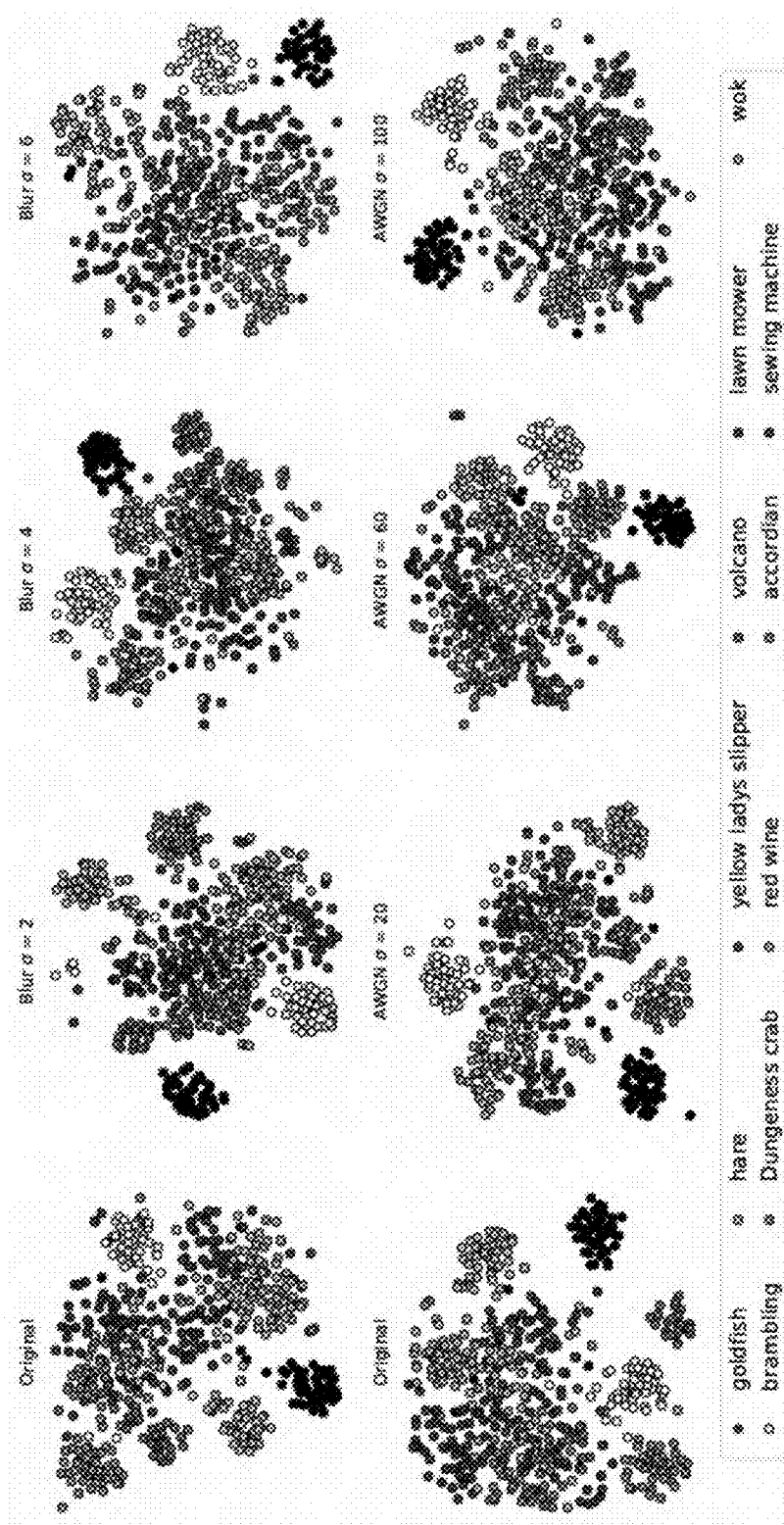
FIG. 10 are illustrations showing two-dimensional t-SNE embeddings of a penultimate layer features of Deepcorr-5, according to aspects of the present disclosure.

Tables VII-VIII show the superior performance of the proposed method as compared to fine-tuning a model. The Deepcorr-5c model performs the best with ≈12% and ≈5% average improvement relative to Finetune-8 for Gaussian blur and AWGN, respectively. Deepcorr-5c significantly improves the robustness of a pre-trained DNN achieving an average top-1 accuracy of 0.5135 and 0.5124 for Gaussian blur and AWGN affected images, respectively, as compared to the corresponding top-1 accuracy of 0.2305 and 0.2375 for the pre-trained AlexNet DNN. However, this requires training slightly more parameters than those trained for Finetune-8, whereas the Deepcorr-5 model is able to recover most of the performance lost by the baseline model, by just training 2.81 million parameters (95.4% lesser parameters than Finetune-8). The Deepcorr-5 model outperforms Finetune-8 with a 10% and 4% relative average improvement for Gaussian blur and AWGN, respectively. FIG. 10 shows the t-SNE feature embedding of the Deepcorr-5 model features for classes shown in FIG. 2. Unlike the clustering of classes in FIG. 2, Deepcorr-5 features are discriminative enough to generate a concise clustering of images from the same class and also provide a good separation between clusters of other classes, even as distortion severity increases. Deepcorr-5's average performance is only 1.2% lower relative to Deepcorr-5c whilst training 96% lesser parameters than Deepcorr-5c, which indicates that most of the distortion invariance can be encoded in the earlier convolutional layers. All the Deepcorr-5 model variants consistently outperform the Finetune-8 model for both distortion types and all levels of distortion.

TABLE IX

Top-1 accuracy of the Deepcorr-5 model for the ImageNet validation set (ILSVRC2012), with filter outputs for correction having been chosen using either a local or global ranking approach. Performance is reported in terms of Top-1 accuracy averaged over all distortion levels, including original images.

| Filter ranking | Gaussian blur | AWGN |
|---|---|---|
| Local | 0.5071<br># corrected per layer<br>{72, 192, 192, 192, 128} | 0.5093<br># corrected per layer<br>{72, 192, 192, 192, 128} |
| Global | 0.5062<br># corrected per layer<br>{81, 128, 168, 207, 192} | 0.5087<br># corrected per layer<br>{71, 150, 187, 193, 175} |

Figure 11:
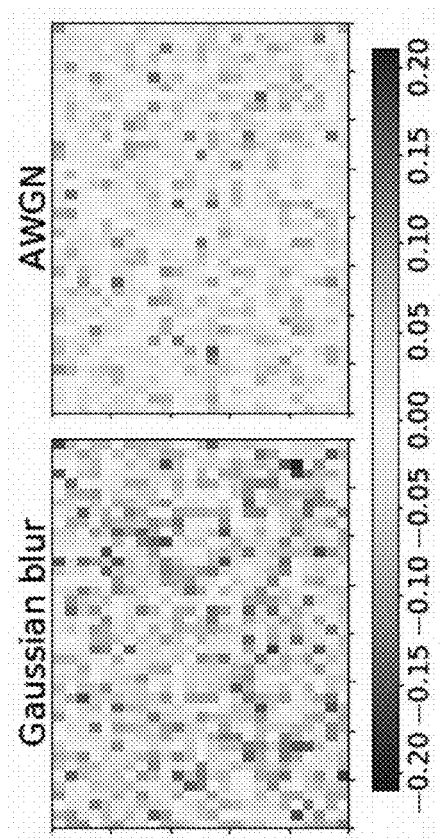
FIG. 11 are images showing a two dimensional heat map of per-class accuracy difference between Deepcorr-5 model and Finetune-8 model for the ImageNet validation set, according to aspects of the present disclosure.

The classification performance for Deepcorr-5 and Finetune-8 is evaluated by plotting a 2-dimensional heat map of the per-class accuracy difference between Deepcorr-5 and Finetune-8, as shown in FIG. 11. Each square in the heat map represents one class in ImageNet, with positive values in the heat map (blue) representing classes for which Deepcorr-5 outperforms Finetune-8 and negative values (red) representing the opposite. Deepcorr-5 not only outperforms Finetune-8 for most classes but also does so by a larger margin as compared to classes for which Finetune-8 outperforms Deepcorr-5. For completeness, the classification performance was compared with a commonly used non-blind image denoising method (BM3D) and a deblurring method (NCSR). The corresponding Top-1 accuracy for these two methods is reported in Tables VII-VIII, with the Deepcorr-5 model outperforming each for AWGN and Gaussian blur, respectively.

Finally in Table IX, the effect of using a global ranking approach for Deepcorr-5 is evaluated, where the correction priority computed using Algorithm 1 to rank filters across all convolutional layers is used By correcting the same number of total filter activations as the local ranking approach (776 filters out of 1376), it is observed that the global ranking approach achieves an average accuracy similar to that of the local ranking approach. A paired sample t-test between the local and global ranking accuracies yielded a p-value of 0.8662 (>0.05), i.e. the difference between the global and local ranking accuracies was not statistically significant.

Correction Unit Architectures

Increasing the correction width (Di in FIG. 7) makes the correction unit wider, whereas decreasing Di makes the correction unit thinner. A natural choice for Di would be to make it equal to the number of distortion susceptible filters that need correction ($\beta_i N_i$), in a DNN layer i; this is also the default parameter setting used in the correction units for Deepcorr-5, as shown in the first row of Table X. Such correction units are referred to as critically-wide (CW) correction units. Since the correction width is always equal to the number of distortion susceptible filters that need correction (i.e. $D_i = \beta_i N_i$), the number of trainable parameters in the CW correction units of Deepcorr-5 scale linearly with the number of corrected filters ($\beta_i N_i$) in each convolutional layer, even though Deepcorr-5 trains significantly lesser parameters than Finetune-8 and still achieves a better classification accuracy. Considering the practical constraints on time-complexity and memory usage while training/testing extremely deep networks, training CW correction units, where correction width equals the number of filters that need correction (i.e. $D_i = \beta_i N_i$), may not be economical.

One way to reduce the number of trainable parameters in correction units is to choose a single value for the correction width ($D_i$) which keeps the number of trainable parameters low and also does not significantly reduce the learning capacity of the corresponding DeepCorrect models. An example of such a correction unit with lesser trainable parameters can be seen in row two of Table X. Replacing each CW correction unit in Deepcorr-5 with such a computationally lite correction unit results in a DeepCorrect model that updates lesser parameters than Deepcorr-5 and which is referred to as Deepcorr-5-lite (Table X, row two). For Deepcorr-5-lite, correction width Di is equal to 128 for $1 \leq i \leq 5$. Table X shows architecture details for Deepcorr-5 and Deepcorr-5-lite. As shown in Table X, unlike the CW correction units of Deepcorr-5, the number of trainable parameters in each correction unit of Deepcorr-5-lite are approximately equal and do not increase as the number of filters corrected ($\beta_i N_i$) increase, while going from cony-1 to conv-n, where conv-i is the $i^{th}$ convolutional layer in an n layered DNN.

Another way to limit the number of trainable parameters and floating-point operations (FLOPs) is to explore a bottleneck architecture for the correction units, where the correction width Di is set to 50% of the distortion susceptible filters that need correction in a DNN layer i $$(D_i = \frac{\beta_i N_i}{2},$$

i.e. dimensionality reduction), along with an additional 3×3 convolutional layer. Replacing each CW correction unit in Deepcorr-5 with such a bottleneck correction unit results in a DeepCorrect framework model that has significantly lesser trainable parameters and FLOPs than Deepcorr-5, which is referred to as Deepcorr-5-bottleneck (Table X, row three).

The Deepcorr-5-lite and Deepcorr-5-bottleneck are trained using the same learning rate schedule and data augmentation used for Deepcorr-5. The top-1 accuracy on the ImageNet validation set is reported in Tables XI and XII. As shown in Tables XI and XII, Deepcorr-5-lite is able to achieve almost the same average accuracy as Deepcorr-5, with a 41% reduction in trainable parameters and a 17.3% reduction in FLOPs, relative to Deepcorr-5. Similarly, Deepcorr-5-bottleneck achieves 99% of the average accuracy achieved by Deepcorr-5, with a 63% reduction in trainable parameters and a 73% reduction in FLOPs, relative to Deepcorr-5. As seen in Table X, compared to Deepcorr-5-lite, Deepcorr-5-bottleneck trains 38% lesser parameters and performs 67% lesser FLOPs. From Tables X-XII, it is evident that Deepcorr-5-bottleneck provides the best tradeoff between model capacity and computational complexity.

Accelerating Training

Figure 12:
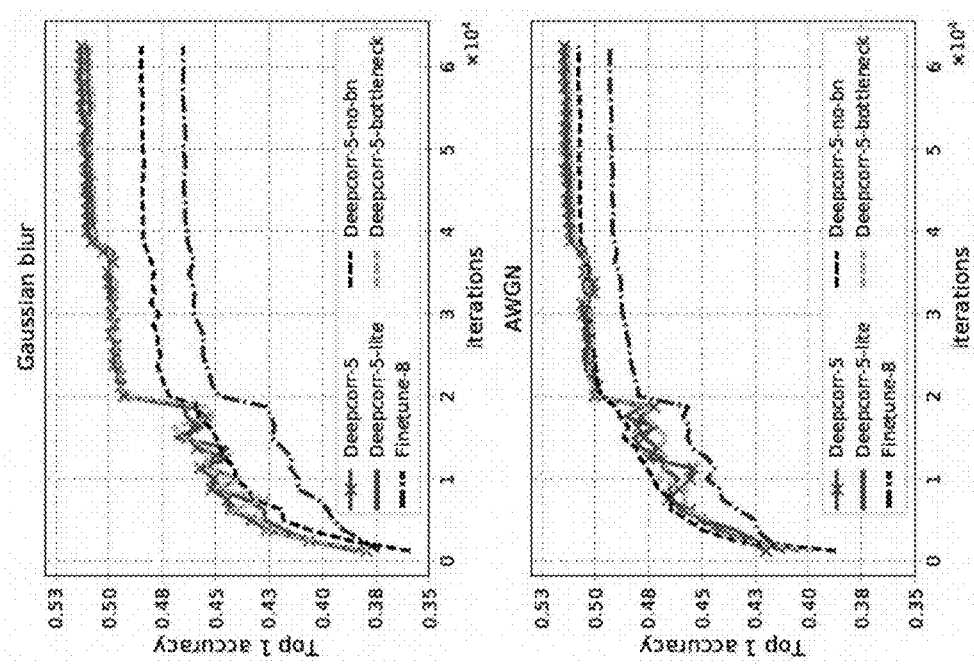
FIG. 12 is a graphical representation showing ImageNet validation set accuracy for DeepCorrect framework variants and fine-tuning, according to aspects of the present disclosure.

The evolution of validation set accuracy over training iterations for four Deepcorr-5 model variants will be discussed including the Finetune-8 model. As shown in FIG. 12, all four Deepcorr-5 model variants not only achieve a final validation accuracy higher than the Finetune-8 model, but also train faster. For any particular value of validation accuracy achieved by the Finetune-8 model in FIG. 12, all four Deepcorr-5 model variants are able to achieve the same validation accuracy with much lesser number of training iterations, with Deepcorr-5, Deepcorr-5-lite and Deepcorr-5-bottleneck being fastest, followed by Deepcorr-5-no-bn. Thus, it is concluded that just learning corrective transforms for activations of a subset of convolutional filters in a layer accelerates training, with an additional speedup achieved by incorporating batch normalization in the correction units.

TABLE X

Architecture details of DeepCorrect models for AlexNet, along with the number of trainable parameters for each model. The number following Corr-unit specifies the layer at which correction units are applied. Correction unit convolutional layers are represented as [k × k, d], where k × k is the spatial extent of a filter and d is the number of filters in a layer.

| Model | Corr-unit 1 $\beta_1 N_1 = 72$ | Corr-unit 2 $\beta_2 N_2 = 192$ | Corr-unit 3 $\beta_3 N_3 = 192$ | Corr-unit 4 $\beta_4 N_4 = 192$ | Corr-unit 5 $\beta_5 N_5 = 128$ |
|---|---|---|---|---|---|
| Deepcorr-5 | [1×1, 72; 5×5, 72; 5×5, 72; 1×1, 72] | [1×1, 192; 3×3, 192; 3×3, 192; 1×1, 192] | [1×1, 192; 3×3, 192; 3×3, 192; 1×1, 192] | [1×1, 192; 3×3, 192; 3×3, 192; 1×1, 192] | [1×1, 128; 3×3, 128; 3×3, 128; 1×1, 128] |
| # total params: 2.81 × 10⁶ | # params: 270.288 # FLOPs: 8.16 × 10⁸ | # params: 739.200 # FLOPs: 5.38 × 10⁸ | # params: 739.200 # FLOPs: 1.24 × 10⁸ | # params: 739.200 # FLOPs: 1.24 × 10⁸ | # params: 328.960 # FLOPs: 5.54 × 10⁷ |
| Deepcorr-5-lite[a] | [1×1, 128; 3×3, 128; 3×3, 128; 1×1, 72] | [1×1, 128; 3×3, 128; 3×3, 128; 1×1, 192] | [1×1, 128; 3×3, 128; 3×3, 128; 1×1, 192] | [1×1, 128; 3×3, 128; 3×3, 128; 1×1, 192] | [1×1, 128; 3×3, 128; 3×3, 128; 1×1, 128] |
| # total params: 1.67 × 10⁶ | # params: 314.568 # FLOPs: 9.49 × 10⁸ | # params: 345.408 # FLOPs: 2.51 × 10⁸ | # params: 345.408 # FLOPs: 5.82 × 10⁷ | # params: 345.408 # FLOPs: 5.82 × 10⁷ | # params: 328.960 # FLOPs: 5.54 × 10⁷ |
| Deepcorr-5-bottleneck[a] | [1×1, 36; 3×3, 36; 3×3, 36; 3×3, 36; 1×1, 72] | [1×1, 96; 3×3, 96; 3×3, 96; 3×3, 96; 1×1, 192] | [1×1, 96; 3×3, 96; 3×3, 96; 3×3, 96; 1×1, 192] | [1×1, 96; 3×3, 96; 3×3, 96; 3×3, 96; 1×1, 192] | [1×1, 64; 3×3, 64; 3×3, 64; 3×3, 64; 1×1, 128] |
| # total params: 1.03 × 10⁶ | # params: 40.680 # FLOPs: 1.22 × 10⁸ | # params: 287.040 # FLOPs: 2.08 × 10⁸ | # params: 287.040 # FLOPs: 4.83 × 10⁷ | # params: 287.040 # FLOPs: 4.83 × 10⁷ | # params: 127.872 # FLOPs: 2.15 × 10⁷ |

[a]We use a pair of dialated convolutions (Yu and Kolton, 2015) of size 3 × 3 in place of traditional 5 × 5 convolutions in Corr-unit 1, to generate an effective receptive field of size 7 × 7.

TABLE XI

Top-1 accuracy of DeepCorrect models with different correction unit architectures, for Gaussian blur affected images of the ImageNet validation set (ILSVRC2012). Bold numbers show best accuracy for each distortion level.

| Method | Distortion Level | | | | | | | | # Params |
| --- | --- | --- | --- | --- | --- | --- | --- | --- | --- |
| | $\sigma_b = 0$ | $\sigma_b = 1$ | $\sigma_b = 2$ | $\sigma_b = 3$ | $\sigma_b = 4$ | $\sigma_b = 5$ | $\sigma_b = 6$ | Avg | (millions) |
| Deepcorr-5 | 0.5724 | 0.5522 | 0.5240 | 0.5100 | 0.4937 | 0.4643 | 0.4334 | 0.5071 | 2.81 |
| Deepcorr-5-lite | 0.5718 | 0.5518 | 0.5254 | 0.5091 | 0.4899 | 0.4605 | 0.4270 | 0.5050 | 1.67 |
| Deepcorr-5-bottleneck | 0.5701 | 0.5504 | 0.5232 | 0.5070 | 0.4856 | 0.4560 | 0.4233 | 0.5022 | 1.03 |

TABLE XII

Top-1 accuracy of DeepCorrect models with different correction unit architectures, for AWGN affected images of the ImageNet validation set (ILSVRC2012). Bold numbers show best accuracy for each distortion level.

| Method | Distortion Level | | | | | | | | # Params |
| --- | --- | --- | --- | --- | --- | --- | --- | --- | --- |
| | $\sigma_n = 0$ | $\sigma_n = 10$ | $\sigma_n = 20$ | $\sigma_n = 40$ | $\sigma_n = 60$ | $\sigma_n = 80$ | $\sigma_n = 100$ | Avg | (millions) |
| Deepcorr-5 | 0.5712 | 0.5660 | 0.5546 | 0.5213 | 0.4870 | 0.4509 | 0.4138 | 0.5092 | 2.81 |
| Deepcorr-5-lite | 0.5711 | 0.5660 | 0.5527 | 0.5211 | 0.4871 | 0.4499 | 0.4125 | 0.5086 | 1.67 |
| Deepcorr-5-bottleneck | 0.5705 | 0.5649 | 0.5513 | 0.5191 | 0.4843 | 0.4456 | 0.4085 | 0.5063 | 1.63 |

Generalization of DeepCorrect Features to Other Datasets

To analyze the ability of distortion invariant features learnt for image classification to generalize to related tasks like object recognition and scene recognition the Deepcorr-5, baseline AlexNet and Finetune-8 models trained on the ImageNet dataset are evaluated as discriminative deep feature extractors on the Caltech-101, Caltech-256 and SUN-397 datasets. The Caltech-101 dataset consists of 101 object classes with a minimum of 40 images per class. The Caltech-256 dataset consists of 256 object classes with a minimum of 80 images per class. Unlike the task of object recognition, where the aim is to classify the main object in the image, the goal of scene recognition is to classify the entire scene of the image. Unlike object recognition datasets like Caltech-101 and Caltech-256, which bear some similarity to an image classification/object recognition dataset like ImageNet, a scene recognition dataset like SUN-397 bears no similarity to the ImageNet dataset and is expected to be very challenging for features extracted using models learnt on ImageNet. The SUN-397 dataset consists of 397 scene categories with at least 100 images per class. Following the experimental procedure proposed by Donahue et al (2014), the output of the first (Caltech-101 and Caltech-256) or second (SUN-397) fully-connected layer in these models was used as a deep feature extractor that can be used for object recognition and scene recognition in images affected by distortion.

TABLE XIII

Mean accuracy per category of pre-trained AlexNet deep feature extractor for clean images.

| Caltech-101 | Caltech-256 | SUN-397 |
| --- | --- | --- |
| 0.8500 | 0.6200 | 0.3100 |

TABLE XIV

Mean accuracy per category for Gaussian blur affected images, averaged over all distortion levels. Bold numbers show best accuracy.

| Dataset | Baseline | Finetune-8 | Deepcorr-5 |
| --- | --- | --- | --- |
| Caltech-101 | 0.4980 | 0.7710 | 0.8371 |
| Caltech-256 | 0.2971 | 0.5167 | 0.5883 |
| SUN-397 | 0.1393 | 0.2369 | 0.3049 |

TABLE XV

Mean accuracy per category for AWGN affected images, averaged over all distortion levels. Bold numbers show best accuracy.

| Dataset | Baseline | Finetune-8 | Deepcorr-5 |
| --- | --- | --- | --- |
| Caltech-101 | 0.3423 | 0.7705 | 0.8034 |
| Caltech-256 | 0.1756 | 0.4995 | 0.5482 |
| SUN-397 | 0.0859 | 0.1617 | 0.2936 |

Since the above deep feature models have not been trained on any one of these datasets (Caltech-101, Caltech-256 and SUN-397), for each dataset, linear SVMs are trained on top of the deep features, which are extracted from a random set of training data, and evaluate the performance in terms of mean accuracy per category averaged over 5 data splits, following the training procedure adopted by Donahue et al (2014). The training data for each split consists of 25 training images and 5 validation images per class, sampled randomly from the considered dataset and all remaining images are used for testing. A baseline accuracy for undistorted images is first established by training linear SVMs on features extracted only from undistorted images using the AlexNet DNN shown in FIG. 3B, and results are reported in Table XIII.

Similar to the evaluation described herein, Gaussian blur and AWGN was independently added to train and test images using the same distortion levels as used for the ImageNet dataset. This performance averaged over all distortion levels is reported in Tables XIV-XV for deep features extracted using baseline AlexNet, Finetune-8 and Deepcorr-5 models trained on ImageNet (For each of the three models, a single set of linear SVMs was trained for images affected by different levels of distortion and also clean images).

Both Gaussian blur and AWGN significantly affect the accuracy of the baseline feature extractor for all three datasets, with a 41% and 60% drop in respective accuracies for Caltech-101, a 52% and 71% drop in respective accuracies for Caltech-256, and a 55% and 72% drop in respective mean accuracy for SUN-397, relative to the benchmark performance for clean images. For Caltech-101, the Deepcorr-5 feature extractor outperforms the Finetune-8 feature extractor with a 8.5% and 4.2% relative improvement in mean accuracy for Gaussian blur and AWGN affected images, respectively. For Caltech-256, the Deepcorr-5 feature extractor outperforms the Finetune-8 feature extractor with a 13.8% and 9.7% relative improvement for Gaussian blur and AWGN, respectively. Similarly, features extracted using the Deepcorr-5 model significantly outperform those extracted using the Finetune-8 model for SUN-397, with a 28.7% and 81.5% relative improvement in mean accuracy for Gaussian blur and AWGN, respectively. The large performance gap between Deepcorr-5 and Finetune-8 feature extractors highlights the generic nature of distortion invariant features learnt by the DeepCorrect framework models.

Experimental Results on Adversarial Perturbations

Figure 13:
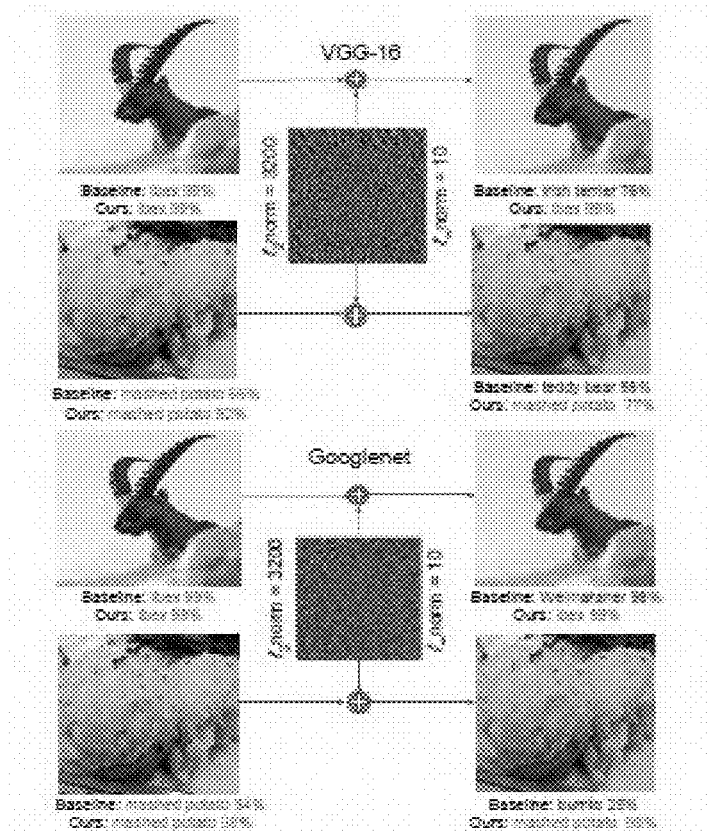
FIG. 13 is an illustration showing the effect of adversarial perturbation on deep neural network (DNN) predictions, according to aspects of the present disclosure.

FIG. 13 shows DNN predictions and confidence scores for different images perturbed with the same universal adversarial perturbation (perturbation generated using the method of Moosavi-Dezfooli et al., 2017). A DNN with no defense (Baseline) misclassifies perturbed images (right) with high confidence even when it classifies clean images (left) correctly. The proposed defense (Ours) correctly classifies both perturbed and clean images with high confidence.

Figure 15:
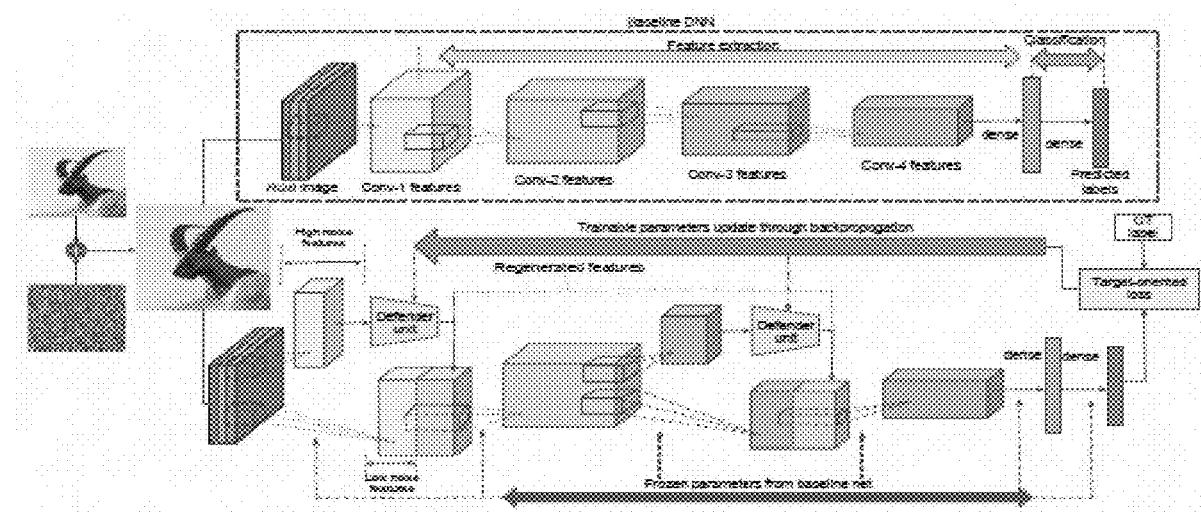
FIG. 15 is a simplified illustration showing how our DeepCorrect framework can be used as a defense against adversarial attacks.

FIG. 15 shows how our DeepCorrect framework can be used as a defense against adversarial attacks and adversarial perturbations through resilient feature regeneration. Convolutional filter activations in the baseline DNN (top) are first sorted in order of vulnerability to adversarial noise (e.g., using their respective filter weight norms or other ranking metric). We deploy feature transformations in the form of defender units, consisting of a residual block with a single skip connection (4 layers) at the output of vulnerable activations (high-noise features) to regenerate input features into noise-resilient features that restore the lost accuracy of the baseline DNN, while leaving the remaining filter activations (low-noise features) unchanged. We train these units on both clean and perturbed images in every mini-batch using the same target loss as the baseline DNN such that all parameters of the baseline DNN are left unchanged during training.

Performance results were produced using adversarially perturbed test images from the ImageNet dataset. The publically available code provided by Moosavi-Dezfooli et al. (2017) was used to generate the universal adversarial perturbations for testing. We use all 50000 images during evaluation for easy reproducibility of results. We compute 5 independent universal adversarial test perturbations per network using a set of 10000 held out images randomly chosen from the training set with the fooling ratio for each perturbation lower-bounded to 0.8 for the CaffeNet, VGG-F, VGG-16, and GoogLeNet networks and to 0.6 for ResNet50, on the held out images, and with the maximum normalized inner product between any two perturbations for the same DNN upper bounded to 0.15.

Figure 16:
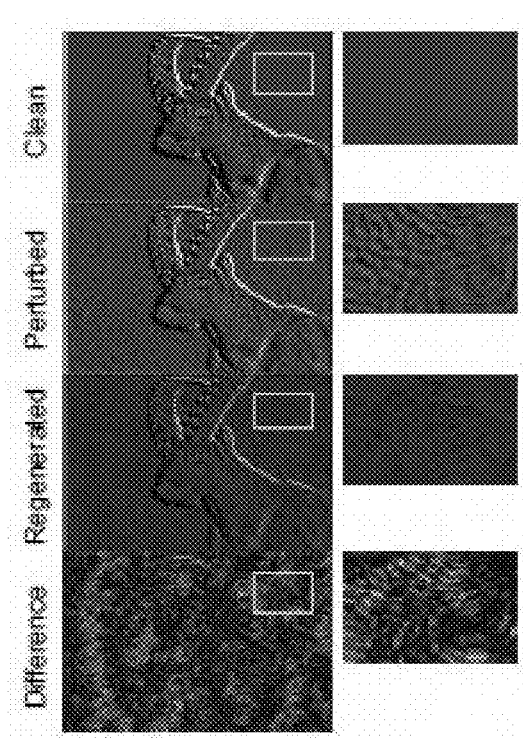
FIG. 16 are images of filter activation maps (also called feature maps or filter outputs), according to aspects of the present disclosure.

Top-1 accuracy is reported in Table XVI for various DNNs (no defense) and our proposed defense for respective DNNs under both white-box (same network used to generate and test attack) and black-box (tested network is different from network for which attack was generated) settings. It can be seen from Table XVI that the top-1 accuracy of baseline DNNs is severely affected by both white-box and black-box attacks, whereas our proposed defense is not only able to effectively thwart the white-box attacks but is also able to generalize to attacks constructed for other networks without further training. Since different DNNs can share common adversarial directions in their feature space, our defender units get trained on regularizing such directions against unseen data and are able to defend against black-box attacks. FIG. 16 shows a visual example of how our correction units (also called defender units in FIG. 15) remove adversarial perturbations from perturbed activation maps whilst preserving the discriminative features of the original perturbation-free activation maps.

TABLE XVI

Top-1 accuracy of different classifiers against an I-infinity norm universal adversarial attack (with I-infinity norm set to 10) under both white-box and black-box settings. Target fooling ratio for ResNet-50 is 0.6 and 0.8 for all other DNNs. DNNs in column one are tested with attacks generated for DNNs in row one.

| | CaffeNet | VGG-F | GoogleNet | VGG-16 | Res50 |
|---|---|---|---|---|---|
| CaffeNet orignal accuracy 56.4% | | | | | |
| CaffeNet | 0.109 | 0.298 | 0.456 | 0.431 | 0.479 |
| Ours | 0.542 | 0.524 | 0.510 | 0.457 | 0.513 |
| VGG-F original accuracy 58.4% | | | | | |
| VGG-F | 0.299 | 0.150 | 0.461 | 0.417 | 0.495 |
| Ours | 0.556 | 0.550 | 0.548 | 0.492 | 0.545 |
| GoogLeNet original accuracy 68.6% | | | | | |
| GoogLeNet | 0.519 | 0.539 | 0.260 | 0.472 | 0.549 |
| Ours | 0.651 | 0.653 | 0.653 | 0.637 | 0.660 |
| VGG-16 original accuracy 68.4% | | | | | |
| VGG-16 | 0.549 | 0.559 | 0.519 | 0.240 | 0.534 |
| Ours | 0.615 | 0.622 | 0.646 | 0.655 | 0.652 |
| Res50 original accuracy 72.3% | | | | | |
| Res50 | 0.593 | 0.605 | 0.545 | 0.448 | 0.390 |
| Ours | 0.652 | 0.654 | 0.677 | 0.644 | 0.677 |

To evaluate the resilience of our DeepCorrect-based defense framework to unseen attacks, we train our correction units (also called defender units in FIG. 15) only using I-infinity norm universal adversarial perturbations generated using the method of Moosavi-Dezfooli et al., 2017, and test the resilience of our DeepCorrect-based defense to other unseen attacks and sources of noise without any additional attack-specific training. For this evaluation, we choose 7 additional attacks that cover both white-box and black-box attacks. Results are reported in Table XVII using the restoration accuracy (Akhtar et al., 2018) which is given:

$$\text{Restoration Accuracy} = \text{acc}(l_{p+c})/\text{acc}(l_c)$$

where $l_c$ is a set containing the clean images, $l_{p+c}$ is the set containing both the clean and perturbed images, and acc(.) is the top-1 accuracy.

From Table XVII, it can be seen that our DeepCorrect-based defense approach is resilient to unseen attacks and achieves the best restoration accuracy on all the attacks as compared to the baseline DNN.

TABLE XVII

Resilience across various attacks on CaffeNet: restoration accuracy against various other attacks using defender units trained on just l-infinity norm universal adversarial examples. Attacks include: Univ. adv. (Moosavi-Dezfooli et al., 2017), AWGN, Local adv.(Su et al., 2017), FGSM (Goodfellow et al., 2014), DeepFool (Moosavi-Dezfooli et al., 2016), IGSM (Kurakin et al., 2016), Singular-UAP (Khrulkov et al., 2018), and Sensor noise (Diamond et al., 2017)

| Defense | Univ. adv $l_2 = 3000$ | AWGN $l_2 = 7700$ | Local adv. $l_2 = 6600$ | FGSM $l_2 = 194$ | DeepFool $l_2 = 68$ | IGSM $l_2 = 800$ | Singular UAP $l_2 = 3930$ | Sensor noise $l_2 = 6920$ | Average |
|---|---|---|---|---|---|---|---|---|---|
| Baseline | 0.596 | 0.921 | 0.741 | 0.715 | 0.611 | 0.553 | 0.852 | 0.836 | 0.728 |
|  | 0.975 | 0.936 | 0.816 | 0.765 | 0.918 | 0.584 | 0.914 | 0.870 | 0.847 |

Conclusion

Deep networks trained on pristine images perform poorly when tested on distorted images affected by image blur or additive noise. Evaluating the effect of Gaussian blur and AWGN on the activations of convolutional filters trained on undistorted images, it was observed that select filters in each DNN convolutional layer were more susceptible to input distortions than the rest. A novel objective metric has been discovered to assess the susceptibility of convolutional filters to distortion and use this metric to identify the filters that maximize DNN robustness to input distortions, upon correction of their activations.

Correction units, which are residual blocks, were designed that are comprised of a small stack of trainable convolutional layers and a single skip connection per stack. These correction units are added at the output of the most distortion susceptible filters in each convolutional layer, whilst leaving the rest of the pre-trained (on undistorted images) filter outputs in the network unchanged. The resultant DNN models which are referred to as DeepCorrect framework models, significantly improve the robustness of DNNs against image distortions and also outperform the alternative approach of network fine-tuning on common vision tasks like image classification, object recognition and scene classification, whilst training significantly less parameters and achieving a faster convergence in training. Fine-tuning limits the ability of the network to learn invariance to severe levels of distortion, and re-training an entire network can be computationally expensive for very deep networks. By correcting the most distortion-susceptible convolutional filter outputs, not only is it possible to make a DNN robust to severe distortions, but also to maintain a very good performance on clean images.

Although image classification and object recognition of the DeepCorrect framework is described, the framework is generic enough to apply to a wide selection of tasks that use DNN models such as object detection or semantic segmentation.

Deep Learning Enabled Generative Sensing Framework

Background

Recent advances in machine learning coupled with the accessibility of compact and low-cost multimedia sensors, such as visible image and infrared (IR) cameras, have fundamentally altered the way humans live, work and interact with each other. However, the performance of available sensors is still significantly constrained by the quality/cost tradeoff of the sensors themselves and by the sensitivity of deep learning algorithms to variations in sensor data quality and sensor modality. For example, image quality may be impacted by environmental factors, i.e., lighting conditions, and specifications of sensors, i.e., number of pixels, dynamic range, noise, etc. Under low-lighting conditions, the visible wavelength image suffers while the IR image may not largely suffer from the dark environment; the quality of both (visible and IR) may suffer due to low-end sensor performance.

Low-power low-profile (thin) sensors are often limited to produce low-resolution (blurry) and low SNR (noisy) images. It has been previously shown that such degradations, even at relatively small levels, can cause a significant drop in the classification performance of state-of-the-art DNNs which are typically trained using high-resolution images. Previously, image quality was an aspect very often overlooked while designing deep learning based image classification systems. It has been shown very recently that, although DNNs perform better than or on par with humans on pristine high-resolution images, the DNN classification performance is still significantly much lower than human performance on images with degradations in quality. FIG. 17 illustrates that, while humans are capable of recognizing with a reasonable accuracy objects in low-resolution blurred images or in low SNR noisy images, DNNs that are trained on pristine images predict incorrect class labels even at a relatively low-level of perceivable degradation.

A visible wavelength image sensor comprises a core part of digital cameras and smart phones. The cost of image sensors has been aggressively scaled largely due to the high-volume consumer market products. In addition to the cost, the technical specification of image sensors, including the number of pixels, color contrast, dynamic range, and power consumption, meet almost all demands of consumer market products. IR sensors, on the other hand, have been mostly used for specific needs such as surveillance- and tracking-based applications in the military domain, yet some started penetrating the consumer market recently. IR sensors typically cost significantly higher than image sensors to produce IR images at an equivalent resolution primarily due to the relatively low volume market. Generally those sensors show a trend of "the higher the cost is, the better the delivered performance."

During the training phase (FIG. 2A), given high-end/high quality sensor data of type X and low-end/low quality sensor data of type Y, where types X and Y can be the same (X=Y) or different (X≠Y), feature maps are obtained by applying DNN ø to each set of data separately. "Type" here refers to data acquisition/transmission under varying conditions (e.g., one or more of varying illumination, environment, transmission medium, sensor acquisition characteristics and resolution) and/or varying modalities (e.g., visible, NIR, IR, Ultrasound, RADAR; speech/audio). Let $\varphi_{high}$ and $\varphi_{low}$ denote, respectively, the set of feature maps resulting from the high-end sensor data and low-end sensor data. Using a distance measure to quantify difference between co-located features in $\varphi_{high}$ and $\varphi_{low}$, feature difference maps $\Delta\varphi$ are obtained. The primary interest is in locating feature differences that result in a significant drop in classification accuracy (e.g., a drop greater than a certain user-defined value) by finding features in $\varphi_{low}$ that are significantly different from co-located features in $\varphi_{high}$ based on the change in classification accuracy. One approach for locating such features is by measuring the classification accuracy drop when a feature in $\varphi_{high}$ is replaced by its co-located $\varphi_{low}$ feature while keeping all other features in $\varphi_{high}$ unchanged. Another approach for determining significant feature differences can be based on maximizing the drop in classification accuracy by replacing clusters of features in $\varphi_{high}$ with clusters of features in $\varphi_{low}$. Classification based feature difference maps $\Delta\varphi$ can thus be obtained with values corresponding to the classification accuracy drop. $\Delta\varphi$ can also be thresholded to produce a binary significance difference tensor (significance mask) with a value of 1 denoting a significant feature difference at a location and a value of 0 denoting an insignificant difference. Selective feature regeneration is performed by learning transformations to be applied only to features in $\varphi_{low}$ corresponding to significant $\Delta\varphi$ values, while leaving all other features in $\varphi_{low}$ unchanged. Such transformations can be learned by using relatively small residual learning units or by adopting other learning models. Such transformations are referred to as generative transformation units or simply as generative units for short. The resulting generative sensing network $\emptyset_{gen}$ consists of the original pre-trained DNN $\emptyset$ augmented with generative unites that are applied to a select limited number of significant features. During the testing phase (FIG. 2B), low-end type Y sensor data is classified using the generative sensing DNN $\emptyset_{gen}$ to obtain an improved classification accuracy. In this way, the proposed generative sensing aims to convert the low-end sensor into a high-end sensor in terms of matched classification accuracy.

When the generative unit takes the form of a multi-layer network with trainable parameters, the generative transform can be estimated by determining the trainable parameters $W_{gen}$ of each generative unit so as to minimize a target-oriented loss function.

$$E(W_{gen}) = \lambda\rho(W_{gen}) + \frac{1}{M}\sum_{i=1}^{M}\mathcal{L}(\phi_{gen}(x_i), y_i)$$

Where $L(.,.)$ is a classification loss function, $y_i$ is a target output label for input $x_i$, $\emptyset_{gen}(.)$ is the output of the network with the selectively applied generative units, which are referred to as generative sensing network, $\rho(.)$ is a regularization term (e.g., $l_1$ or $l_2$ norm), $\lambda$ is a regularization parameter, and M is the total number of data samples in the training set. The generative units are designed to have a relatively small number of parameters as compared to DNN $\emptyset$.

Performance Results

Figure 18:
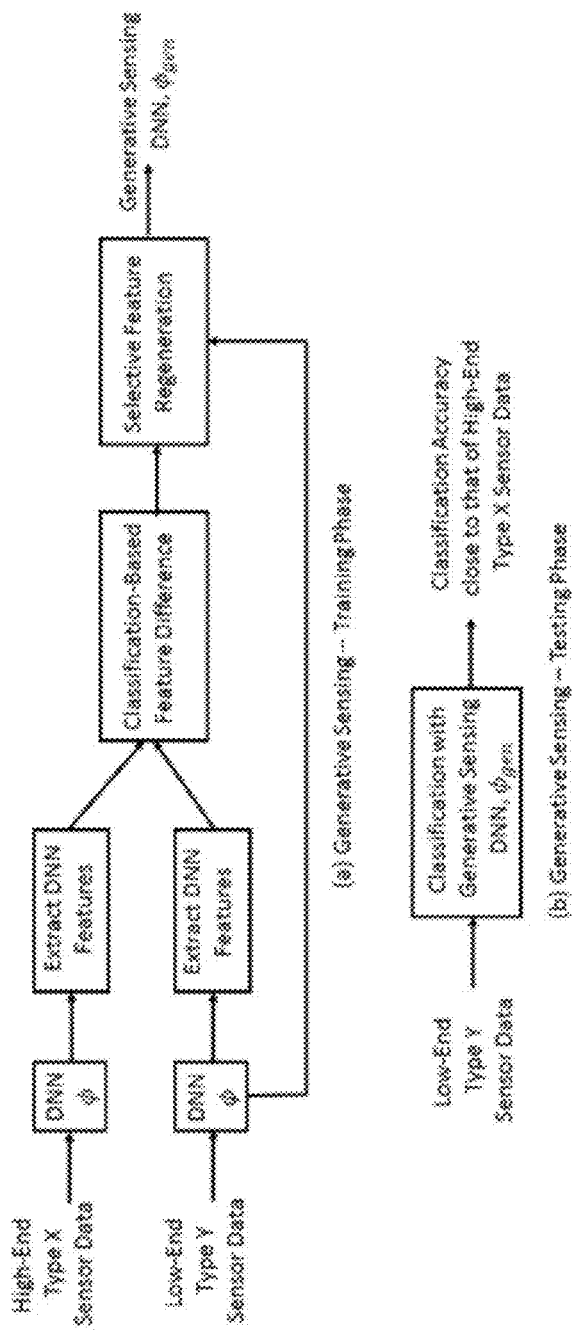
FIG. 18 is a simplified illustration showing a generative sensing framework, according to aspects of the present disclosure.

The baseline AlexNet that has been pre-trained for object recognition on the relatively high-quality visible-wavelength (RGB) ImageNet dataset has been adopted for the baseline pre-trained DNN $\emptyset$ of FIG. 18 in order to show the performance of the generative sensing framework 100 and its ability to generalize to different tasks (e.g., face recognition, scene recognition), different input modalities (e.g., RGB, NIR, and IR), and different sensor sizes/resolutions. For varying tasks and input modalities, the RGB-IR SCface face recognition dataset and the EPFL RGB-NIR scene recognition dataset are used. Unlike the task of face recognition, where the aim is to assign the face in a test image to one of the known subjects in a database, the goal of scene recognition is to classify the entire scene of the image.

The SCface dataset was primarily designed for surveillance-based face recognition. It consists of images acquired in the visible (RGB) as well as infrared spectrum (IR) for 130 subjects, with one frontal mugshot image per subject, for each input modality in addition to other non-frontal mugshots. In this case, the frontal mugshot images were used. The EPFL RGB-NIR Scene dataset consists of nine scene categories with at least 50 images per class, for both visible (RGB) and near-infrared spectra (NIR).

The effect of decreasing the input sensor resolution was simulated by blurring the original images by a Gaussian kernel, where the size of the blur kernel is set to four times the blur standard deviation $\sigma_b$. Using a blur standard deviation $\sigma_b \in \{0, 1, 2, 3, 4, 5, 6\}$ for Gaussian blur, seven successively decreasing levels of sensor resolution were simulated, with $\sigma_b=0$ representing the original high resolution sensor and $\sigma_b=6$ representing the lowest sensor resolution.

The output of the second fully-connected layer in the baseline AlexNet model is used as a deep feature extractor for the face recognition and scene recognition tasks with images acquired under different sensor resolutions (high to low) and modalities (RGB, NIR, IR). Since the baseline AlexNet model has not been trained on the SCface and EPFL RGB-NIR Scene dataset, for each dataset and for each modality, a new fully connected layer with a softmax activation on top of deep features that are extracted only from the original dataset images (i.e., o⁻b=0) is trained, and the performance of such a deep feature extractor for different levels of sensor resolution (i.e., o⁻b E $\{0, 1, 2, 3, 4, 5, 6\}$) and for each modality is evaluated. The new fully connected layer acts like a linear classifier and has a dimensionality equal to the number of classes in the corresponding dataset.

TABLE I

Top-1 accuracy for images of the SCface dataset acquired under different sensor resolutions and different input modalities, respectively. For each modality (RGB and IR), bold numbers show best accuracy for each resolution level.

| Method-Modality | Sensor Resolution: Blur Level | | | | | | | |
|---|---|---|---|---|---|---|---|---|
| | $\sigma_b = 0$ | $\sigma_b = 1$ | $\sigma_b = 2$ | $\sigma_b = 3$ | $\sigma_b = 4$ | $\sigma_b = 5$ | $\sigma_b = 6$ | Avg |
| Baseline-RGB | 0.9923 | 0.7538 | 0.4384 | 0.3230 | 0.1461 | 0.1000 | 0.0770 | 0.4043 |
| Generative Sensing-RGB | 0.9538 | 0.9461 | 0.9000 | 0.8692 | 0.7692 | 0.6846 | 0.6461 | 0.8241 |

TABLE I-continued

Top-1 accuracy for images of the SCface dataset acquired under
different sensor resolutions and different input modalities, respectively.
For each modality (RGB and IR), bold numbers show best accuracy for
each resolution level.

| Method-Modality | Sensor Resolution: Blur Level | | | | | | | |
|---|---|---|---|---|---|---|---|---|
| | $\sigma_b = 0$ | $\sigma_b = 1$ | $\sigma_b = 2$ | $\sigma_b = 3$ | $\sigma_b = 4$ | $\sigma_b = 5$ | $\sigma_b = 6$ | Avg |
| Baseline-IR | 0.9769 | 0.7923 | 0.4769 | 0.1076 | 0.0461 | 0.0076 | 0.0076 | 0.3450 |
| Generative Sensing-IR | 0.9000 | 0.8777 | 0.8077 | 0.7538 | 0.6538 | 0.5077 | 0.4692 | 0.7098 |

TABLE II

Top-1 accuracy for images of the RGB-NIR Scene dataset acquired
under different sensor resolutions and different input modalities,
respectively. For each modality (RGB and NIR), bold numbers
show best accuracy for each resolution level.

| Method-Modality | Sensor Resolution: Blur Level | | | | | | | |
|---|---|---|---|---|---|---|---|---|
| | $\sigma_b = 0$ | $\sigma_b = 1$ | $\sigma_b = 2$ | $\sigma_b = 3$ | $\sigma_b = 4$ | $\sigma_b = 5$ | $\sigma_b = 6$ | Avg |
| Baseline-RGB | 0.9444 | 0.8466 | 0.7644 | 0.6177 | 0.4622 | 0.3511 | 0.2911 | 0.6110 |
| Generative Sensing-RGB | 0.9333 | 0.8555 | 0.8511 | 0.8555 | 0.8333 | 0.8355 | 0.8200 | 0.8548 |
| Baseline-IR | 0.7629 | 0.6733 | 0.5911 | 0.4000 | 0.3088 | 0.2488 | 0.2200 | 0.4578 |
| Generative Sensing-IR | 0.7518 | 0.7200 | 0.7177 | 0.6977 | 0.6622 | 0.6377 | 0.6222 | 0.6870 |

Next the baseline AlexNet DNN 4) (layers 1 to 7) is replaced with the generative sensing DNN $\varnothing_{gee}$ 4)$_{.gen}$ (i.e., baseline AlexNet augmented with generative units) while using the same previously learnt final fully connected layer with softmax activation on top of it as a linear classifier. The generative units were only trained using the ImageNet dataset augmented by adding degraded versions of the ImageNet images with varying levels of blur to simulate varying sensor resolutions. From the results shown in Tables I and II it can be concluded that, although no images from the SCface and RGB-NIR Scene datasets were used for training, the produced generative units generalize well.

Tables I and II present the performance results on all levels of sensor resolution for the SCface dataset and the RGB-NIR Scene dataset, respectively. It should be noted a new classifier is not learned to act on top of the generative sensing deep feature extractor, but instead the one trained for the baseline AlexNet deep feature extractor is used.

As shown in Tables. I and II, for both the visible spectrum and the near-infrared/infrared spectrum, the sensor resolution significantly affects the accuracy of the baseline feature extractor, with a 59% and 64% drop in respective average accuracies for the SCface dataset, a 35% and 40% drop in respective average accuracies for the RGB-NIR Scene dataset relative to the original sensor resolution (i.e., $\sigma_b=0$).

For the SCface dataset, the generative sensing feature extractor significantly outperforms the baseline feature extractor with a respective 103% and 105% relative improvement in mean accuracy for the visible spectrum and infrared spectrum. Similarly, for the RGB-NIR Scene dataset, the generative sensing feature extractor significantly outperforms the baseline feature extractor with a respective 40% and 50% relative improvement in mean accuracy for the visible spectrum and the near-infrared spectrum. The large performance gap between the generative sensing feature extractor and the baseline AlexNet feature extractor highlights the generic nature of the modality-invariant and sensor resolution-invariant features that are learnt by the generative sensing models.

Conclusion

The present disclosure presents a deep learning based generative sensing framework for attaining increased classification accuracy on par with the classification accuracy of a high-end sensor while only using a low-end sensor. The high- and low-end sensors can be of different types, in which case the proposed framework can be seen as transforming one type of sensor (e.g., NIR or IR sensor) into another type of sensor (e.g., visible spectrum image sensor) in terms of classification performance. This is achieved through learned transformations that perform selective feature regeneration for improved classification. This is important for enabling robust low-power and low-cost sensing platforms that can work under varying conditions without compromising the recognition performance.

Adaptable—The framework can operate using different input modalities (e.g., RGB, NIR, IR, Radar, Ultrasound, LIDAR, Audio/Speech) and can an operate under low SNR and under adverse conditions.

Cost Effective and Robust—The proposed framework can achieve high-end sensor/high-quality channel accuracy using low-end sensors/low-quality channels Computing System FIG. 19 is an example schematic diagram of the generative sensing framework 100 that may implement various methodologies discussed herein. For example, the generative sensing framework 100 may comprise a server used to execute aspects of the Generative Sensing Framework 100 including the above mentioned subsystems that operate with the Generative Sensing Framework 100. The Generative Sensing Framework 100 includes a bus 101 (i.e., interconnect), at least one processor 102 or other computing element, at least one communication port 103, a main memory 104, a removable storage media 105, a read-only memory 106, and a mass storage device 107. Processor(s) 102 can be any known processor, such as, but not limited to, an Intel® Itanium® or Itanium 2® processor(s), AMD® Opteron® or Athlon MP® processor(s), or Motorola® lines of processors. Communication port 103 can be any of an RS-232 port for use with a modem based dial-up connection, a 10/100 Ethernet port, a Gigabit port using copper or fiber, or a USB port. Communication port(s) 103 may be chosen depending on a network such as a Local Area Network (LAN), a Wide Area Network (WAN), or any network to which the Generative Sensing Framework 100 connects. Computing system may further include a transport and/or transit network 155, a display screen 160, an I/O port 140, and an input device 145 such as a mouse or keyboard.

Main memory 104 can be Random Access Memory (RAM) or any other dynamic storage device(s) commonly known in the art. Read-only memory 106 can be any static storage device(s) such as Programmable Read-Only Memory (PROM) chips for storing static information such as instructions for processor 102. Mass storage device 107 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 101 communicatively couples processor(s) 102 with the other memory, storage, and communications blocks. Bus 101 can be a PCI/PCI-X, SCSI, or Universal Serial Bus (USB) based system bus (or other) depending on the storage devices used. Removable storage media 105 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 104 may be encoded with the Generative Sensing Framework 100 including the various subsystems and related programs that supports the functionality discussed above. In other words, aspects of the Generative Sensing Framework 100 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 102 accesses main memory 104 via the use of bus 101 in order to launch, run, execute, interpret or otherwise perform processes, such as through logic instructions, executing on the processor 102 and based on the instructions of the Generative Sensing Framework 100 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Certain embodiments are described herein as including one or more modules, e.g. modules that execute instructions related to the operation of the Generative Sensing Framework 100. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" or "module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for generative sensing comprising:
conducting a training phase on a plurality of datasets in which the plurality of datasets comprises high quality data of a type X and low quality data of a type Y by a processor, wherein the high quality data of type X and low quality data of type Y can be of the same type or of different types; and
applying a neural network $\varphi$ to the high quality data of a type X and to the low quality data of a type Y to obtain a first set of feature maps associated with the high quality data of a type X ($\varphi_{high}$), and a second set of feature maps associated with low quality data of a type Y ($\varphi_{low}$);
using a distance measure to quantify feature differences between co-located features in $\varphi_{high}$ and $\varphi_{low}$ to obtain feature difference maps, $\Delta\varphi$; and
locating feature differences in $\varphi_{low}$ that are significantly different from co-located features in $\varphi_{high}$ based on a change in classification accuracy.

2. The method of claim 1, wherein the neural network is a deep neural network.

3. The method of claim 1, wherein the high quality data and the low quality data are acquired using sensors.

4. The method of claim 1, wherein the high-quality data is acquired using a high end sensor and a low quality data is acquired using a low end sensor.

5. The method of claim 1, wherein one or more of the high quality and low quality data are transmitted using a transmission medium.

6. The method of claim 5 wherein the transmission medium is one or more of a communication channel or a transmission link.

7. The method of claim 1, wherein locating feature differences comprises measuring the classification accuracy drop when a feature in $\varphi_{high}$ is replaced by its co-located $\varphi_{low}$ feature while keeping all other feature in $\varphi_{high}$ unchanged.

8. The method of claim 1, wherein locating feature differences comprises maximizing a drop in classification accuracy by replacing clusters of feature in $\varphi_{high}$ with clusters of features in $\varphi_{low}$.

9. The method of claim 1, further comprising applying feature correction to the high quality data or the low quality data.

10. The method of claim 9, wherein the feature correction is performed using one or more transformations applied to features in $\varphi_{low}$.

11. A method for generative sensing comprising:
conducting a training phase on a plurality of datasets in which the plurality of datasets comprises high quality data of a type X and low quality data of a type Y by a processor, wherein the high quality data of type X and low quality data of type Y can be of the same type or of different types;
applying a neural network $\varphi$ to the high quality data of a type X and to the low quality data of a type Y to obtain a first set of feature maps associated with the high quality data of a type X ($\varphi_{high}$), and a second set of feature maps associated with low quality data of a type Y ($\varphi_{low}$); and
applying feature correction to the high quality data or the low quality data,
wherein the feature correction is performed using one or more transformations applied to features in $\varphi_{low}$, and
wherein the one or more transformations are learned.

12. The method of claim 11, wherein the one or more transformations take each the form of a multi-layer network with learnable parameters.

13. A method for generative sensing comprising:
conducting a training phase on a plurality of datasets in which the plurality of datasets comprises high quality data of a type X and low quality data of a type Y by a processor, wherein the high quality data of type X and low quality data of type Y can be of the same type or of different types; and
applying a neural network $\varphi$ to the high quality data of a type X and to the low quality data of a type Y to obtain a first set of feature maps associated with the high quality data of a type X ($\varphi_{high}$), and a second set of feature maps associated with low quality data of a type Y ($\varphi_{low}$); and
applying feature correction to the high quality data or the low quality data,
wherein the feature correction is applied through a selective feature correction by correcting selectively features in $\varphi_{low}$.

14. The method of claim 13, wherein the selective feature correction is performed by correcting features in $\varphi_{low}$ corresponding to a significant drop in classification accuracy while leaving the other features in $\varphi_{low}$ unchanged.

* * * * *